United States Patent
Fukuhara et al.

(10) Patent No.: US 8,606,007 B2
(45) Date of Patent: Dec. 10, 2013

(54) IMAGE PROCESSING APPARATUS AND METHOD

(75) Inventors: Takahiro Fukuhara, Tokyo (JP); Hitoshi Kiya, Tokyo (JP)

(73) Assignees: Sony Corporation, Tokyo (JP); Tokyo Metropolitan University, Tokyo (JP)

( * ) Notice: Subject to any disclaimer, the term of this patent is extended or adjusted under 35 U.S.C. 154(b) by 0 days.

(21) Appl. No.: 13/554,201

(22) Filed: Jul. 20, 2012

(65) Prior Publication Data

US 2013/0028515 A1 Jan. 31, 2013

(30) Foreign Application Priority Data

Jul. 28, 2011 (JP) ................. 2011-165037

(51) Int. Cl.
*G06K 9/00* (2006.01)

(52) U.S. Cl.
USPC ............ 382/168; 382/170; 382/172; 382/251

(58) Field of Classification Search
USPC ......... 382/168, 170, 172, 195, 260, 251, 264, 382/275; 375/240.03, E7.131; 341/50, 51; 348/671, 674, 739
See application file for complete search history.

(56) References Cited

U.S. PATENT DOCUMENTS

| 7,420,483 | B2 * | 9/2008 | Yokose et al. | 341/51 |
| 7,436,999 | B2 * | 10/2008 | Ohmi et al. | 382/170 |
| 7,711,141 | B2 * | 5/2010 | Burlingame | 382/100 |

* cited by examiner

*Primary Examiner* — Anh Do
(74) *Attorney, Agent, or Firm* — Frommer Lawrence & Haug LLP; William S. Frommer

(57) ABSTRACT

Provided is an image processing apparatus which includes a histogram generating unit that generates a histogram representing an appearance frequency distribution of a pixel value of an input image, and a quantization table generating unit that generates a quantization table including table information used to perform transform of a bit depth of the pixel value of the input image and table information used to allocate an effective pixel in which an appearance frequency in the histogram generated by the histogram generating unit is not zero to an index value after bit depth transform so that effective pixels are allocated to index values as equally as possible.

14 Claims, 18 Drawing Sheets

FIG.1
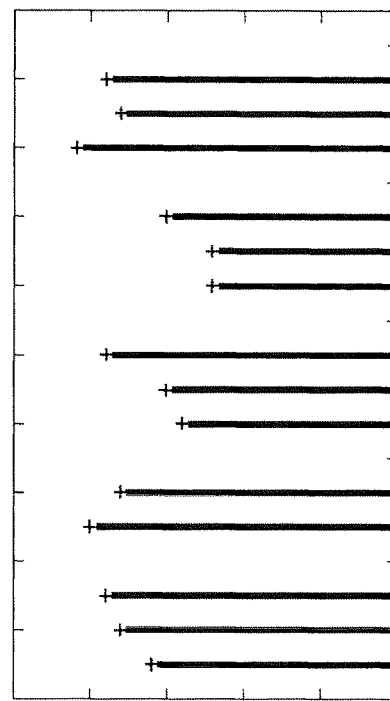
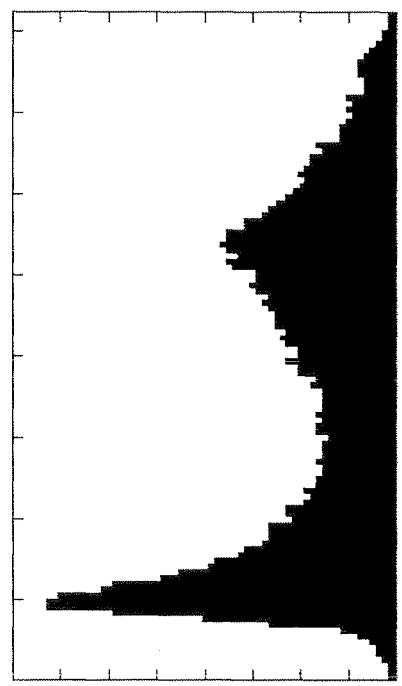

EXAMPLE OF N(12)-BIT MEDICAL IMAGE
(Ne=1835)

FIG.11

TYPE OF IMAGE: MEDICAL IMAGE 12 BITS

| PROCESS | NUMBER OF BITS (M BITS) AFTER QUANTIZATION | | | |
|---|---|---|---|---|
| | 11 BITS | 10 BITS | 9 BITS | 8 BITS |
| Lloyd-Max TECHNIQUE | ∞ | 78.88 | 72.10 | 65.89 |
| LINEAR QUANTIZATION (ROUNDING DOWN) | 75.47 | 70.70 | 65.06 | 59.14 |
| PRESENT TECHNIQUE | ∞ | 78.77 | 71.98 | 65.75 |

FIG.12

| NUMBER OF BITS (M BITS) AFTER QUANTIZATION | PROCESSING TECHNIQUE | |
|---|---|---|
| | PRESENT TECHNIQUE | Lloyd-Max |
| 11 | 0.016534 | 0.034146 |
| 10 | 0.013839 | 0.017966 |
| 9 | 0.013576 | 0.017134 |
| 8 | 0.014752 | 0.023413 |
| 7 | 0.012516 | 0.118285 |
| 6 | 0.012833 | 0.1932249 |
| 5 | 0.013441 | 0.242322 |
| 4 | 0.012857 | 0.243074 |
| 3 | 0.012853 | 0.177168 |
| 2 | 0.012805 | 0.078646 |
| 1 | 0.015066 | 0.050956 |

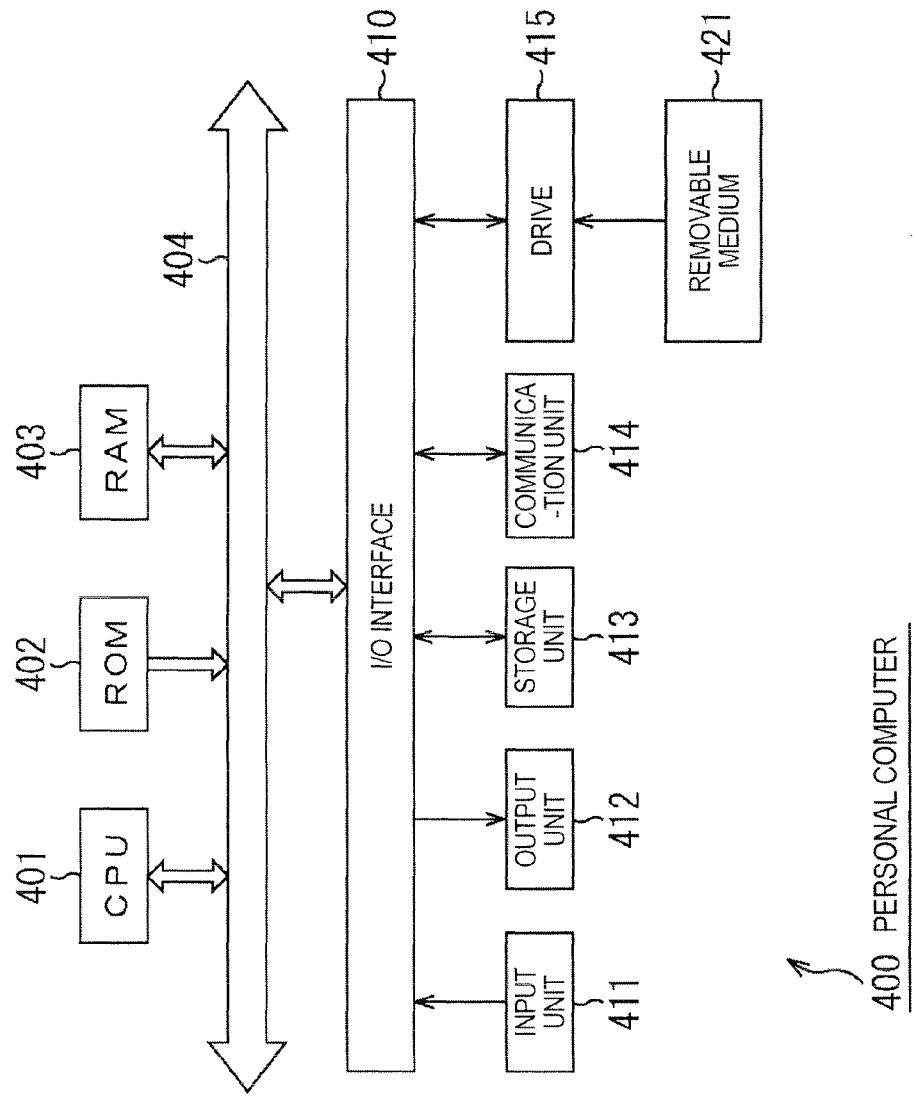

IMAGE PROCESSING APPARATUS AND METHOD

BACKGROUND

The present disclosure relates to an image processing apparatus and method, and more particularly, to an image processing apparatus and method that are capable of suppressing quantization error.

In the related art, bit transform techniques for performing transforms from a high bit depth to a low bit depth have usually been used as a quantization technique for image processing or the like. In other words, an N-bit image is transformed into an L-bit image (N>L) by a quantization process. On the other hand, an inverse transform process from a low bit depth to a high bit depth corresponds to inverse quantization. A linear quantization technique has usually been used as an image quantization technique. However, the linear quantization technique is low in computation cost but relatively large in a quantization error. For this reason, when an image of a high bit depth is transformed into an image of a low bit depth by quantization, and then the image of the low bit depth is transformed back into the image of the high bit depth by inverse quantization (is returned to an original bit depth), the restored image of the high bit depth (the image which has been subjected to the quantization and inverse quantization processes) may exhibit substantial deterioration compared to the original image (the image prior to the quantization and inverse quantization processes).

In this regard, a Lloyd-Max quantization technique has been proposed (for example, see Lloyd, "Least squares quantization in PCM", IEEE Transactions, Information Theory, vol. IT-28, no. 2, pp. 129-137, March 1982). Generally, the Lloyd-Max quantization technique has been known as a quantization technique which results in little image distortion.

SUMMARY

However, in the Lloyd-Max quantization technique, the width of a quantization section and a quantization representative value for giving minimum distortion are calculated iteratively, and thus a processing time may increase.

The present disclosure is made in light of the foregoing, and it is desirable to achieve both a reduction in quantization error and an increase in quantization/inverse quantization process speed.

According to an embodiment of the present disclosure, there is provided an image processing apparatus which includes a histogram generating unit that generates a histogram representing an appearance frequency distribution of a pixel value of an input image, and a quantization table generating unit that generates a quantization table including table information used to perform transform of a bit depth of the pixel value of the input image and table information used to allocate an effective pixel in which an appearance frequency in the histogram generated by the histogram generating unit is not zero to an index value after bit depth transform so that effective pixels are allocated to index values as equally as possible.

The quantization table generating unit may allocate the effective pixels corresponding to an equal allocation number s or (s+1), which is the maximum number of effective pixels which can be equally allocated to all index values after bit depth transform to each index value.

The quantization table generating unit may include a first index value deciding unit that allocates the effective pixels to each index value by the equal allocation number (s+1), a second index value deciding unit that allocates the effective pixels to each index value by the equal allocation number s, and a control unit that selects any one of the first index value deciding unit and the second index value deciding unit, and allocates the effective pixel using the selected index value deciding unit.

The control unit may perform control such that the effective pixels are allocated in order of ascending index value, and allocation of the effective pixels is performed by the first index value deciding unit until the number of index values to which the effective pixels are allocated reaches an allocation residual Nh representing the number of remaining effective pixels when the effective pixels are allocated to each index value by the equal allocation number s, and may perform control such that allocation of the effective pixels is performed by the second index value deciding unit after the number of index values to which the effective pixels are allocated reaches the allocation residual Nh.

The image processing apparatus may further include an effective pixel information generating unit that detects the effective pixel in the histogram generated by the histogram generating unit, and obtains an effective pixel number representing the number of effective pixels and an effective pixel value representing a value of the effective pixel.

The image processing apparatus may further include an equal allocation number calculating unit that calculates the equal allocation number s using the effective pixel number obtained by the effective pixel information generating unit.

The image processing apparatus may further include an allocation residual calculating unit that generates the allocation residual Nh using the effective pixel number obtained by the effective pixel information generating unit and the equal allocation number generated by the equal allocation number calculating unit.

The image processing apparatus may further include a quantization table storage unit that stores the quantization table generated by the quantization table generating unit.

The image processing apparatus may further include a quantization unit that performs quantization on each pixel value of the input image using the quantization table generated by the quantization table generating unit.

The image processing apparatus may further include a representative value table generating unit that generates a representative value table including table information used to perform inverse transform of the bit depth of the pixel value of the input image and table information used to allocate a predetermined representative value set to each index to the index value.

The representative value table generating unit may use a center of gravity of the effective pixel values allocated to each index value as a representative value corresponding to the index value.

The image processing apparatus may further include a representative value table storage unit that stores the representative value table generated by the representative value table generating unit.

The image processing apparatus may further include an inverse quantization unit that performs inverse quantization of the index value using the representative GU value table generated by the representative value table generating unit.

According to another embodiment of the present disclosure, there is provided an image processing method for an image processing apparatus which includes generating, with a histogram generating unit, a histogram representing an appearance frequency distribution of a pixel value of an input image, and generating, with a quantization table generating unit, a quantization table including table information used to perform transform of a bit depth of the pixel value of the input image and table information used to allocate an effective pixel in which an appearance frequency in the histogram generated by the histogram generating unit is not zero to an index value after bit depth transform so that effective pixels are allocated to index values as equally as possible.

According to an embodiment of the present disclosure, a histogram representing an appearance frequency distribution of a pixel value of an input image is generated, and a quantization table including table information used to perform transform of a bit depth of the pixel value of the input image and table information used to allocate an effective pixel in which an appearance frequency in the histogram generated by the histogram generating unit is not zero to an index value after bit depth transform is generated so that effective pixels are allocated to index values as equally as possible.

According to the embodiments of the present disclosure, quantization can be performed. Particularly, quantization error can be reduced while suppressing an increase in quantization processing time.

BRIEF DESCRIPTION OF THE DRAWINGS

FIG. 1 is a diagram describing an example of a histogram of a pixel value;

FIG. 11 is a diagram illustrating an example of image quality after quantization and inverse quantization;

FIG. 12 is a diagram illustrating an example of a processing time;

FIG. 18 is a block diagram illustrating an example of a main configuration of a personal computer.

DETAILED DESCRIPTION OF THE EMBODIMENTS

Figure 2:
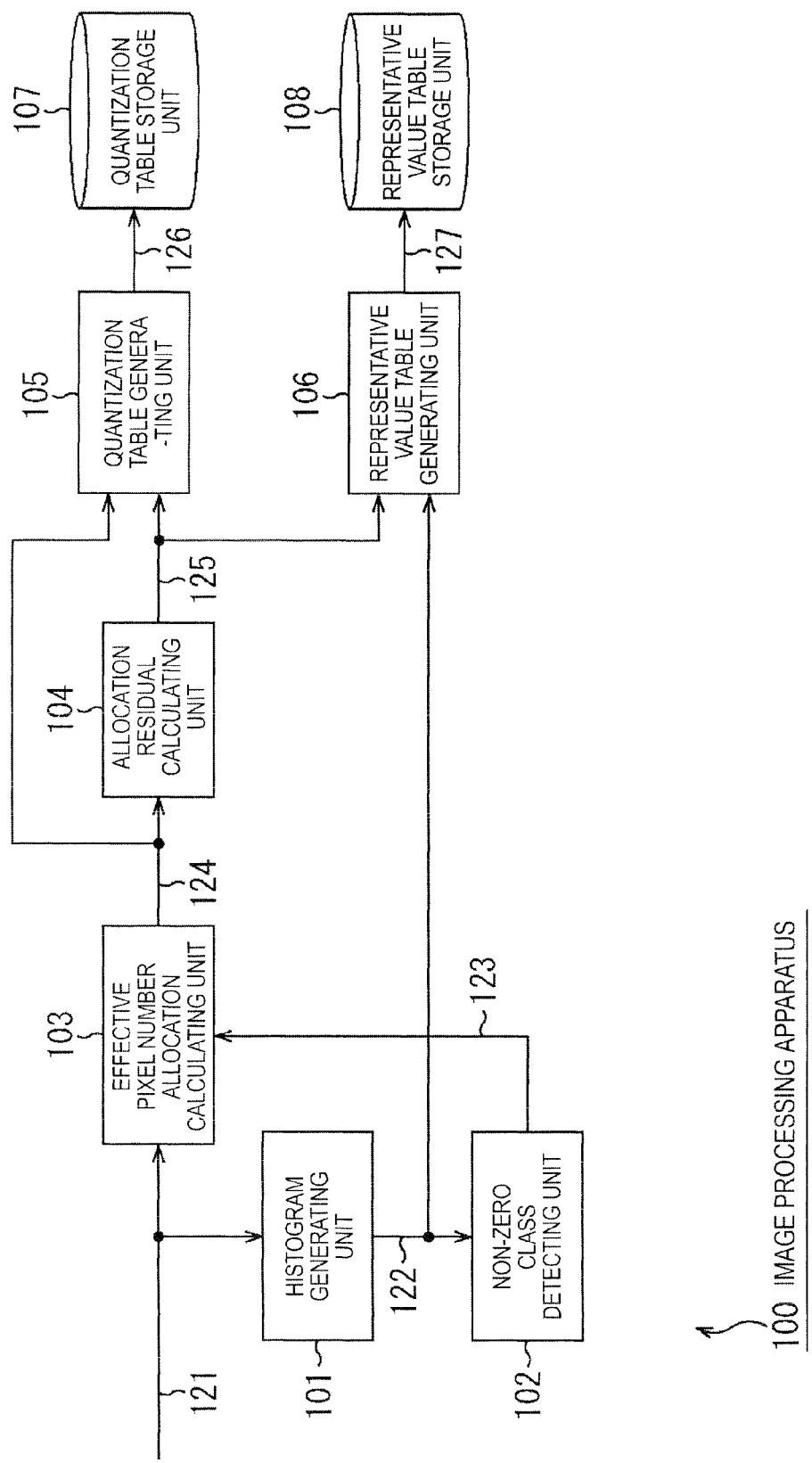
FIG. 2 is a block diagram illustrating an example of a main configuration of an image processing apparatus that performs quantization.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments of the present disclosure (hereinafter, referred to as "embodiments") will be described. The description will proceed in the following order:

1. First Embodiment (image processing apparatus)
2. Second Embodiment (Another Example of Quantization Table Generating Unit)
3. Third Embodiment (Another Example of Quantization Table Generating Unit)
4. Fourth Embodiment (System that Performs Quantization/Inverse Quantization in Units of Blocks)
5. Fifth Embodiment (Personal Computer)

1. First Embodiment

Histogram of Image

Generally, an image has deviation in the frequency of a histogram. For example, an image in which a bit depth of each pixel is N bits does not necessarily have $2^N$ different pixel values. In other words, many images have a sparse histogram. Particularly, in the case of a high-dynamic range image or a RAW image, such sparsity is substantial.

Here, "sparse" means that there is a pixel value whose appearance frequency is zero. In other words, the more pixel values whose appearance frequency is zero, the higher the sparsity.

FIG. 1 is a diagram illustrating an example of a histogram of a luminance component of a RAW image. In a general RAW image, a histogram appears "dense" in whole, that is, it appears as if appearance frequencies of all pixel values are not zero, as illustrated in FIG. 1A. However, many histograms are actually sparse histograms in which appearance frequencies of many pixel values are zero, as illustrated in FIG. 1B. FIG. 1B is an enlarged view of a part of the histogram of FIG. 1A.

As described above, a histogram of a RAW image is generally sparse. In other words, when a pixel having a pixel value whose appearance frequency is not zero is defined as an "effective pixel," the number Ne of effective pixels is $Ne < 2^N$.

When quantization is performed on an image having a sparse histogram using the Lloyd-Max quantization technique, known as an optimal quantization technique, a class in which appearance frequencies of all pixels values are zero is highly likely to be generated. This is because in the Lloyd-Max quantization technique, a histogram is delimited at equal intervals at the time of classification. For this reason, it has been known that the number of classes is insufficient, and so it is difficult to obtain an optimal solution.

In this case, in general purpose mathematical software MATLAB, a representative value is updated by causing two neighboring representative values to become the same value. As a result, a class in which an appearance frequency is zero (0) is merged with a neighboring class. The update process is repeated until the class having an appearance frequency of 0 finally disappears.

However, in the case of this method, neighboring classes are combined into one class, and so the number of classes is reduced. This increases quantization error, and optimality of a solution may not be compensated.

In addition, in the case of the Lloyd-Max quantization technique, the width of a quantization section and a quantization representative value for giving minimum distortion are calculated iteratively, a very long calculation time was necessary. For this reason, a processing time of the entire quantization process may be too long to allow depending on an application.

In this regard, in the present embodiment, a quantization/inverse quantization technique is proposed that is capable of further reducing quantization error compared to the linear quantization of the related art, achieving a minimum quantization error, and that is faster than the Lloyd-Max quantization technique. In the following description, it will be assumed that an input image is a monochrome RAW image. Processing of a color image (multiple components) will be described later.

[Image Processing Apparatus]

In FIG. 2, table information (a quantization table and a representative value table, which will be described later), which are used in a bit depth transform process (that is, a quantization process) that transforms a bit depth of each pixel value of an input image from N bits to L bits (N>L) and an inverse transform process thereof (that is, an inverse quantization process), are generated.

As illustrated in FIG. 2, an image processing apparatus 100 includes a histogram generating unit 101, a non-zero class detecting unit 102, an effective pixel number allocation calculating unit 103, an allocation residual calculating unit 104, a quantization table generating unit 105, and a representative value table generating unit 106.

The histogram generating unit 101 generates an appearance frequency distribution (a histogram H(k) (k=0, 1, ..., $2^N-1$)) of pixel values of an input image using an input image (arrow 121) as shown in FIG. 1. The histogram generating unit 101 counts the number of times that each value (k) appears within a range ($m_0$ to $m_{2^N-1}$) in which a pixel value is obtained in the input image. The histogram H(k) is one in which each value ($m_i$) is associated with an appearance frequency of each value, and represents a frequency distribution of each value ($m_i$). The histogram generating unit 101 supplies the histogram H(k) to the non-zero class detecting unit 102 (arrow 122).

The non-zero class detecting unit 102 detects an effective pixel (H(k)≠0) having a pixel value whose appearance frequency is not zero from the supplied histogram H(k), and calculates the number of effective pixels (an effective pixel number Ne) (Ne≤$2^N$). The non-zero class detecting unit 102 supplies the effective pixel number Ne to the effective pixel number allocation calculating unit 103 (arrow 123).

Further, the non-zero class detecting unit 102 supplies a pixel value (a pixel value corresponding to k causing H(k)≠0) $m_i$ (i=0, ..., Ne−1) (i.e., $m_0, m_1, ..., m_{Ne-1}$) of each detected effective pixel to the effective pixel number allocation calculating unit 103 (arrow 123).

In the case of quantizing an N-bit image to an M-bit image (N>M), when Ne≤$2^M$, all pixel values can be represented by M bits, and so lossless quantization and inverse quantization can be performed. However, when Ne>$2^M$, a quantization error inevitably occurs.

The effective pixel number allocation calculating unit 103 calculates an effective pixel number (equal allocation number) s of each class when effective pixels corresponding to the effective pixel number Ne detected by the non-zero class detecting unit 102 are equally allocated to $2^M$ classes using the following Formula (1).

$$s=[Ne/2^M] \quad (1)$$

Here, [x] represents the largest integer which is not larger than x.

In other words, s effective pixels can be equally allocated to each of $2^M$ classes. The effective pixel number allocation calculating unit 103 supplies the calculated equal allocation number s to the allocation residual calculating unit 104 together with the supplied effective pixel number Ne (arrow 124). At this time, the effective pixel number allocation calculating unit 103 also supplies the effective pixel value $m_i$ to the allocation residual calculating unit 104 (arrow 124).

The allocation residual calculating unit 104 calculates the number of non-allocated effective pixels (an allocation residual Nh) remaining after the effective pixels corresponding to the effective pixel number Ne are allocated to each of classes by the equal allocation number s using the following Formula (2).

$$Nh=Ne-2^M \times s \quad (2)$$

In other words, when the effective pixels corresponding to the effective pixel number Ne are allocated to each of $2^M$ classes by s effective pixels, the effective pixels corresponding to the allocation residual Nh remain. The Nh effective pixels are allocated to some classes as equally as possible, that is, one by one.

In other words, (s+1) effective pixels are allocated to each of Nh classes among $2^M$ classes. However, s effective pixels are allocated to each of ($2^M$−Nh) classes.

The allocation residual calculating unit 104 supplies the calculated allocation residual Nh to the quantization table generating unit 105 (arrow 125).

Further, the effective pixel number allocation calculating unit 103 supplies the equal allocation number s and the effective pixel number Ne to the quantization table generating unit 105 (arrow 124). At this time, the effective pixel number allocation calculating unit 103 also supplies each effective pixel value $m_i$ to the quantization table generating unit 105 (arrow 124).

The quantization table generating unit 105 generates a quantization table $T(m_i)$ used for quantization (bit depth transform) of the pixel value of the input image using the effective pixel number Ne, the effective pixel value $m_i$, the equal allocation number s, and the allocation residual Nh. The quantization table $T(m_i)$ includes table information representing a correspondence relation in which each effective pixel (an effective pixel value $m_i$) before quantization is allocated to each class (index value) after quantization (after bit depth transform). At this time, the quantization table generating unit 105 allocates the effective pixels to each class as equally as possible. More specifically, the quantization table generating unit 105 generates the quantization table $T(m_i)$ using the following Formulas (3) and (4).

$$T(m_i) = \left[\frac{i}{s+1}\right] \quad (i < Nh(s+1)) \quad (3)$$

$$T(m_i) = \left[\frac{i-Nh(s+1)}{s}\right] \quad (i \geq Nh(s+1)) \quad (4)$$

In other words, the quantization table generating unit 105 decides the effective pixel value $m_i$ to allocate on a class to which (s+1) pixel values are allocated using Formula (3), and decides the effective pixel value $m_i$ to allocate on a class to which s pixel values are allocated using Formula (3).

The quantization table is used in a quantization process. The quantization table generating unit 105 supplies the quantization table $T(m_i)$ generated in the above-described way to the quantization table storage unit 107, causing the quantization table $T(m_i)$ to be stored in the quantization table storage unit 107 (arrow 126).

The quantization table storage unit 107 includes an arbitrary storage medium and can store the quantization table $T(m_i)$ in a storage area of the storage medium. For example, the quantization table storage unit 107 may be disposed as a configuration included in the image processing apparatus 100 like a built-in hard disk drive (HDD) or a built-in flash memory. For example, the quantization table storage unit 107 may be disposed as an external configuration of the image processing apparatus 100 like an external HDD or a universal serial bus (USB) flash memory. In addition, the quantization table storage unit 107 may be disposed as a part of a configuration of another device like a hard disk of a network attached storage (NAS). For example, the quantization table storage unit 107 may be a removable medium such as a writable digital versatile disc (DVD) or a Blu-ray disc (BD). In this case, the quantization table storage unit 107 is mounted in a drive (not illustrated) connected to the image processing apparatus 100, and performs read and write operations on the image processing apparatus 100 through the drive. In other words, the quantization table storage unit 107 may be implemented by any device that can store the quantization table.

The allocation residual calculating unit 104 supplies the calculated allocation residual Nh, the equal allocation number s, and the effective pixel value $m_i$ to the quantization table generating unit 105 (arrow 125). Further, the histogram generating unit 101 supplies the histogram H(k) to the quantization table generating unit 105 (arrow 122).

The representative value table generating unit 106 sets a representative value of each class after quantization using the effective pixel value $m_i$, the equal allocation number s, the allocation residual Nh, and the histogram H(k), and generates a representative value table R(n) representing a correspondence relation between each class and the representative value. The representative value table generating unit 106 generates the representative value table R(n) using the following Formulas (5) and (6).

$$R(n) = \frac{\sum_{i=(s+1)n}^{(s+1)n+s} H(m_i) \times m_i}{\sum_{i=(s+1)n}^{(s+1)n+s} H(m_i)} \quad (n < Nh) \quad (5)$$

$$R(n) = \frac{\sum_{i=sn+Nh}^{sn+Nh+s-1} H(m_i) \times m_i}{\sum_{i=sn+Nh}^{sn+Nh+s-1} H(m_i)} \quad (n \geq Nh) \quad (6)$$

Here, a center of gravity of effective pixel values belonging to a class of a processing target is used as a representative value of a corresponding class. The representative value is not limited to the center of gravity and may be any value. For example, an average value or a median value of effective pixel values belonging to a class of a processing target may be used as a representative value of a corresponding class. For example, effective pixel values greatly different in value from others are excluded, then a center of gravity of remaining effective pixel values is calculated, and the center of gravity may be used as a representative value.

As described above, the representative value table generating unit 106 sets a representative value on a class to which (s+1) effective pixel values are allocated using Formula (5), and sets a representative value on a class to which s effective pixel values are allocated using Formula (6).

The representative value table is used in an inverse quantization process. The representative value table generating unit 106 supplies the generated representative value table R(n) to the representative value table storage unit 108, causing the representative value table R(n) to be stored in the representative value table storage unit 108 (arrow 127).

The representative value table storage unit 108 may be implemented by any device that can store the representative value table R(n), similarly to the quantization table storage unit 107.

As described above, the image processing apparatus generates the quantization table and the representative value table from the input image.

[Quantization Table Generating Unit]

Next, generation of the quantization table will be described in further detail.

Figure 3:
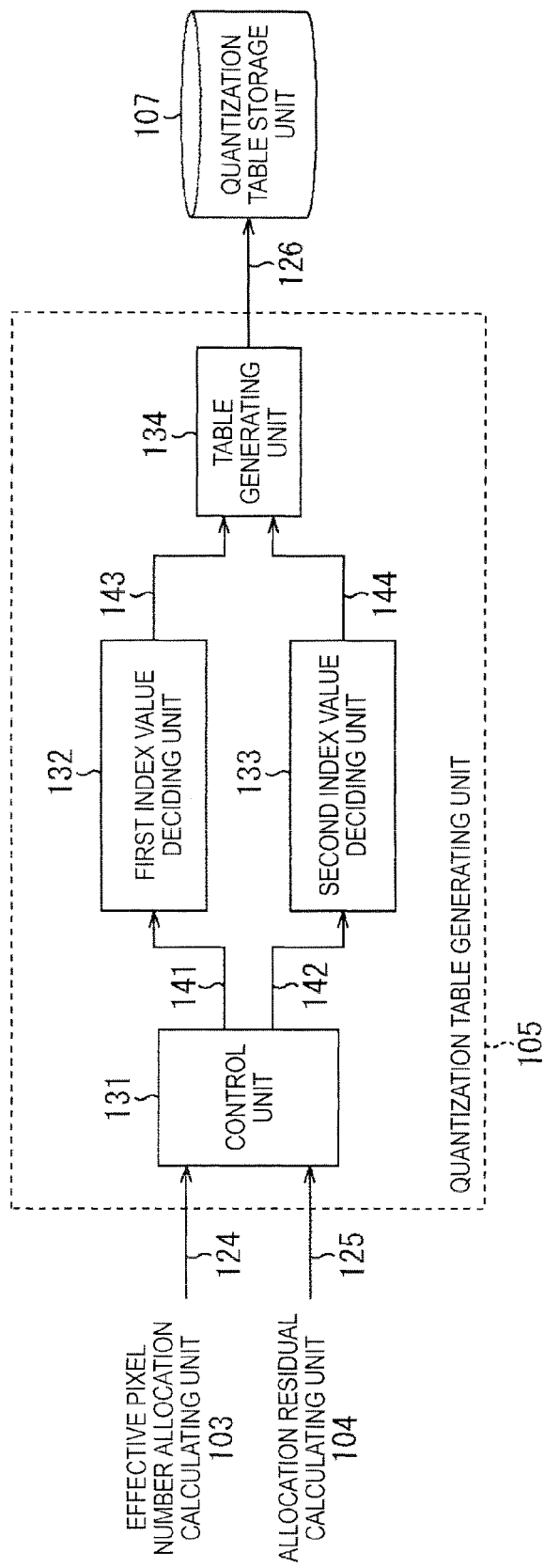
FIG. 3 is a block diagram illustrating an example of a main configuration of a quantization table generating unit.

FIG. 3 is a block diagram illustrating an example of a main configuration of the quantization table generating unit 105 of FIG. 2. As illustrated in FIG. 3, the quantization table generating unit 105 includes a control unit 131, a first index value deciding unit 132, a second index value deciding unit 133, and a table generating unit 134.

The image processing apparatus 100 transforms (quantizes) a bit depth of each pixel value of the input image from N bits to M bits. In other words, the image processing apparatus 100 allocates effective pixel values whose appearance frequency is not zero to $2^M$ classes. When the effective pixel number Ne is larger than $2^M$, the image processing apparatus 100 allocates an effective pixel value to each class so that the effective pixel numbers of the respective classes can be as equal as possible.

As expressed in Formula (1), a quotient obtained by dividing the effective pixel number Ne by a class number $2^M$ after quantization is the largest value (that is, the equal allocation number s) of an effective pixel number which can be allocated equally to each class. A remainder is the allocation residual Nh (see FIG. 4)

The image processing apparatus 100 allocates an effective pixel value to each class so that the effective pixel numbers of the respective classes can be as equal as possible, and so effect pixels corresponding to the allocation residual Nh are allocated to different classes. In other words, the image processing apparatus 100 allocates (s+1) effective pixels to each of Nh classes among $2^M$ classes, and allocates effective pixels to each of remaining (Ne−Nh) classes. For example, when s is 2, effective pixel values are allocated to each of Nh classes by three, and effective pixel values are allocated to each of the remaining classes by two, as illustrated in FIG. 4.

The effective pixel value $m_i$ is allocated to each class by the number decided above, starting from a class having a low identification number, in the order of ascending pixel value. Here, it is optional whether or not to cause Nh classes to each of which (s+1) effective pixels are allocated to be any one of $2^M$ classes. For example, effective pixels may be allocated to each of Nh classes by (s+1), starting from a class having a low identification number, as illustrated in FIG. 4. Below, description will be made in connection with this case.

Figure 4:
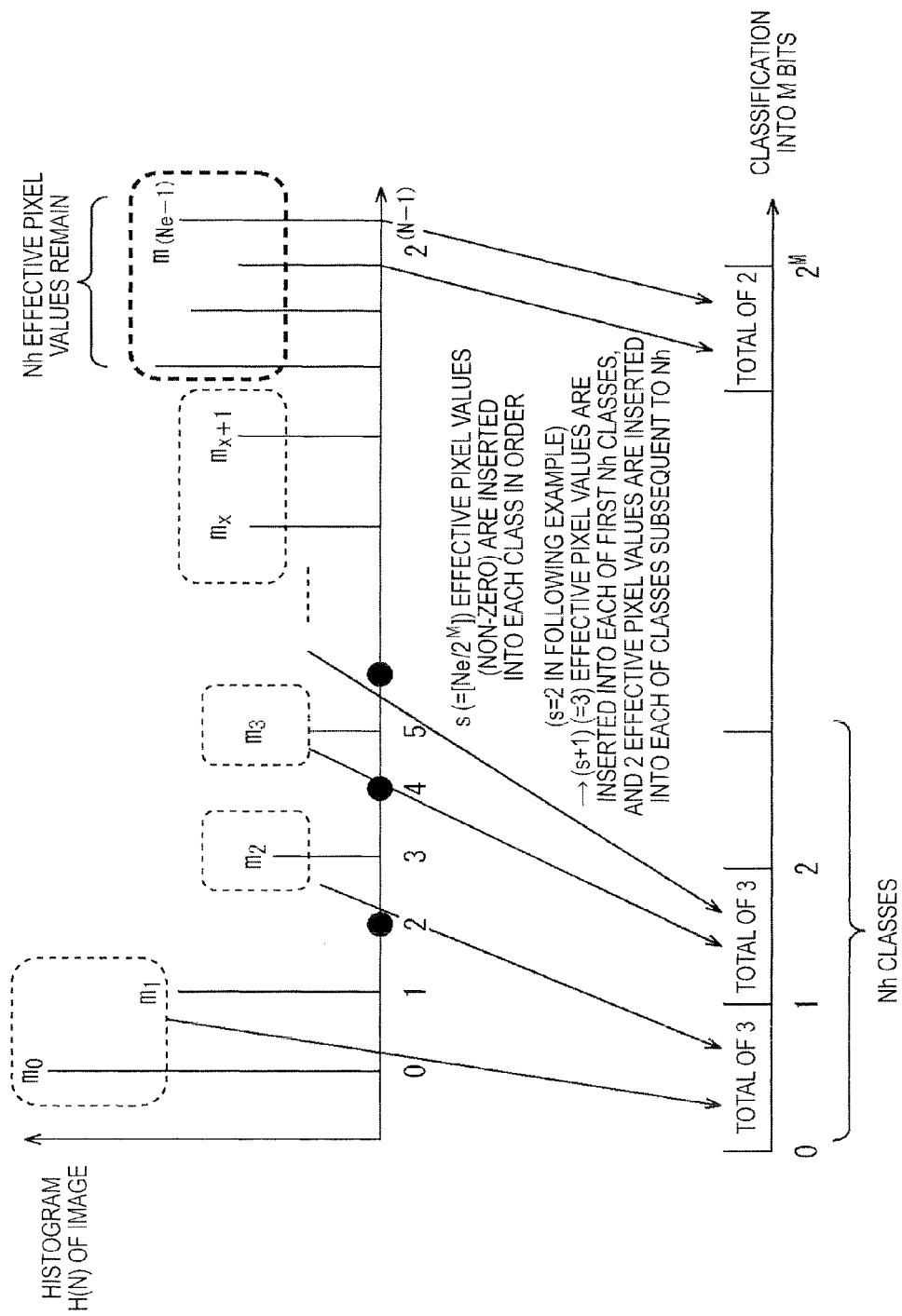
FIG. 4 is a diagram describing an example of a form in which an effective pixel value is allocated.

In the case of the example of FIG. 4, the image processing apparatus 100 allocates effective pixel values to each of classes from a class having a number of 0 to a class having a number of (Nh−1) by three, like effective pixel values $m_0$ to $m_3$, $m_4$ to $m_6$, $m_7$ to $m_9$, and the like in the order of ascending effective pixel value. Further, the image processing apparatus 100 allocates effective pixel values to each of classes having numbers of Nh or later by two like effective pixel value $m_x$ and $m_{x+1}$ in the order of ascending effective pixel value.

In other words, the quantization table generating unit 105 decides an effective pixel value to be allocated to each class and, at this time, uses two methods, i.e., a method of allocating (s+1) effective pixels values to each class and a method of allocating s effective pixels values to each class.

The control unit 131 performs control to select any one of the two methods using the equal allocation number s supplied from the effective pixel number allocation calculating unit 103 and the allocation residual Nh supplied from the allocation residual calculating unit 104. For example, when a processing target number i is larger than Nh(s+1) (i<Nh(s+1)), the control unit 131 selects a first method of setting the quantization table using Formula (3), and then supplies each input data to the first index value deciding unit 132 (arrow 141).

Further, for example, when the processing target number is equal to or more than Nh (i≥Nh(s+1)), the control unit 131 selects a second method of h setting the quantization table using Formula (4), and then supplies each input data to the second index value deciding unit 133 (arrow 142).

The first index value deciding unit 132 decides a correspondence relation between a class after transform (that is, an index value) and an effective pixel value using the effective pixel number Ne, the equal allocation number s, the allocation residual Nh, and Formula (3). In other words, the first index value deciding unit 132 allocates the effective pixel value $m_i$ to each class by (s+1). The first index value deciding unit 132 supplies the set correspondence relation between each class and the effective pixel value $m_i$ to the table generating unit 134 (arrow 143).

The second index value deciding unit 133 decides a correspondence relation between a class after transform (that is, an index value) and an effective pixel value using the effective pixel number Ne, the equal allocation number s, the allocation residual Nh, and Formula (4). In other words, the second index value deciding unit 133 allocates the effective pixel value $m_i$ to each class by s. The second index value deciding unit 133 supplies the set correspondence relation between each class and the effective pixel value $m_i$ to the table generating unit 134 (arrow 144).

The table generating unit 134 integrates the correspondence relations between each class and the effective pixel value $m_i$ supplied from the first index value deciding unit 132 and the second index value deciding unit 133, and generates the quantization table $T(m_i)$. The table generating unit 134 supplies the generated quantization table $T(m_i)$ to the quantization table storage unit 107 (arrow 126).

As described above, the quantization table generating unit 105 can generate the quantization table using the two methods, i.e., the method of allocating (s+1) effective pixels values to each class and the method of allocating s effective pixels values to each class. Thus, the quantization table generating unit 105 can allocate the effective pixel value to each class so that the effective pixel numbers of the respective classes can be as equal as possible. Accordingly, the image processing apparatus 100 can generate the quantization table and the representative value table for implementing quantization and inverse quantization having substantially the same quantization error as in the Lloyd-Max quantization technique.

Further, the quantization table generating unit 105 can allocate the effective pixel value to each class without performing the iterative process described above. Accordingly, the image processing apparatus 100 can generate the quantization table and the representative value table faster than the Lloyd-Max quantization technique.

[Quantization/Inverse Quantization System]

Next, a quantization process using the quantization table generated in the above-described way, and an inverse quantization process using the representative value table generated in the above-described way, will be described.

Figure 5:
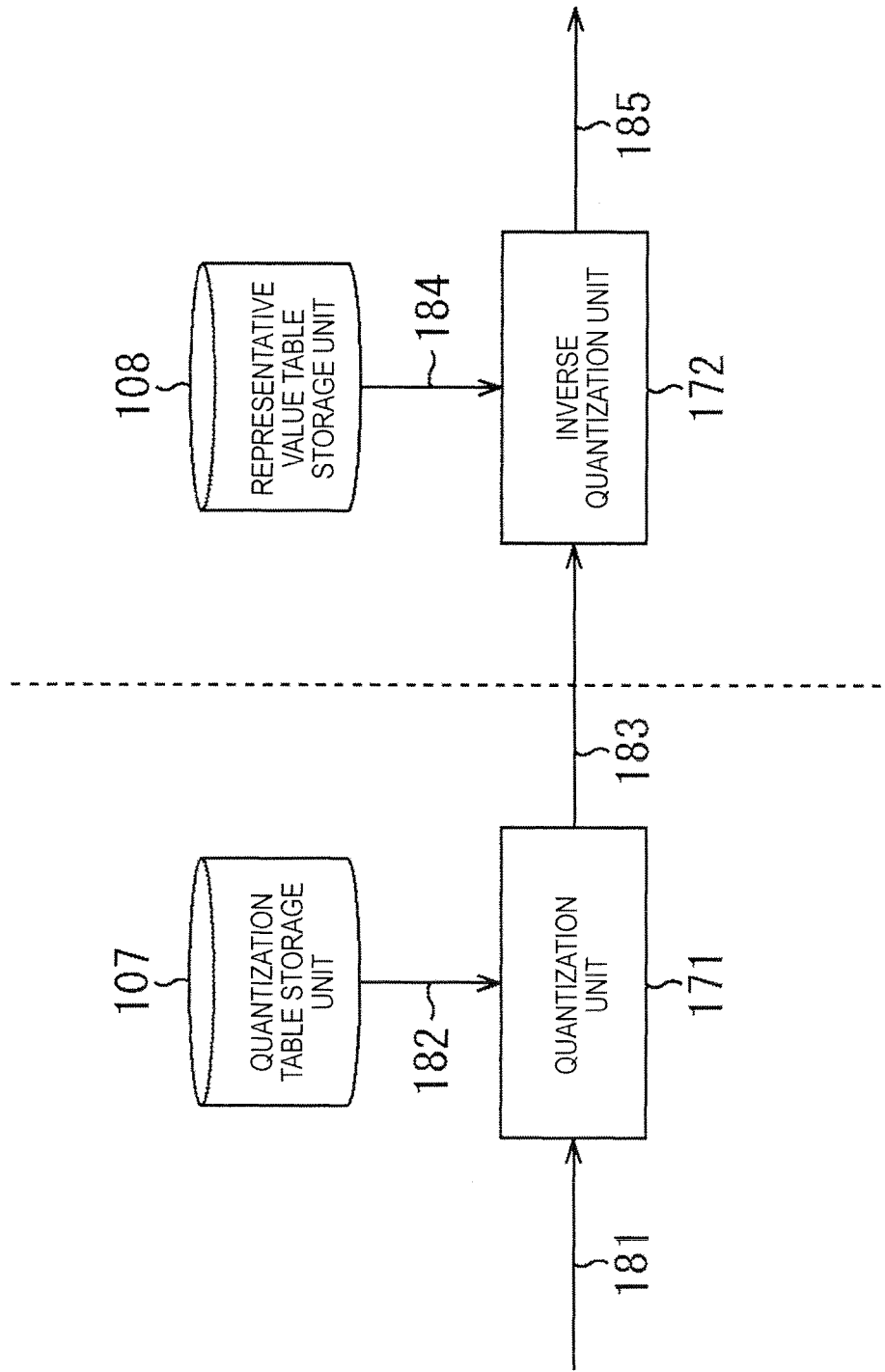
FIG. 5 is a block diagram illustrating an example of a main configuration of a system that performs quantization and inverse quantization.

FIG. 5 is a block diagram illustrating an example of an apparatus that performs quantization and inverse quantization using the quantization table and the representative value table generated by the image processing apparatus 100.

A left side from a dotted line at the center of FIG. 5 represents a configuration related to a quantization process, and a right side from the dotted line represents a configuration related to an inverse quantization process. As illustrated in FIG. 5, the configuration related to the quantization process includes the quantization table storage unit 107 and a quantization unit 171, and the configuration related to the inverse quantization process includes the representative value table storage unit 108 and an inverse quantization unit 172.

The quantization table storage unit 107, the quantization unit 171, the representative value table storage unit 108, and the inverse quantization unit 172 may be configured as different devices from one another. The quantization table storage unit 107 and the quantization unit 171 related to the quantization process may be configured as a single device, and the representative value table storage unit 108 and the inverse quantization unit 172 related to the inverse quantization process may be configured as a single device. Further, the quantization table storage unit 107 and the representative value table storage unit 108 may be configured as a single device. Furthermore, all of the quantization table storage unit 107, the quantization unit 171, the representative value table storage unit 108, and the inverse quantization unit 172 may be configured as a single device. Further, either or both of the quantization unit 171 and the inverse quantization unit 172 may be included in the image processing apparatus 100 of FIG. 2 (that is, they may be configured as a single device).

The same input image as in the image processing apparatus 100 is input to the quantization unit 171 (arrow 181). In other words, the input image from which the quantization table is generated in the image processing apparatus 100 is supplied to the quantization unit 171. The quantization table is stored in the quantization table storage unit 107. The representative value table corresponding to the input image is stored in the representative value table storage unit 108.

The quantization unit 171 reads the quantization table corresponding to the input image from the quantization table storage unit 107 (arrow 182). The quantization unit 171 transforms each pixel value of the input image into an index value using the read quantization table. More specifically, the quantization unit 171 detects a value $T(P(x,y))$ corresponding to a pixel value $P(x,y)$ of the input image from the quantization table $T(m_i)$, and then outputs the value $T(P(x,y))$ as an index value $I(x,y)$, as in the following Formula (7).

$$I(x,y)=T(P(x,y)) \quad (7)$$

The quantization unit 171 supplies the index value (which may be also referred to as a "quantized coefficient") to the inverse quantization unit 172 (arrow 183).

In other words, the index value generated by the quantization unit 171 is input to the inverse quantization unit 172 (arrow 183). The inverse quantization unit 172 reads the representative value table corresponding to the index value from the representative value table storage unit 108 (arrow 184). The inverse quantization unit 172 transforms each index value into an effective pixel value using the read representative value table. More specifically, the inverse quantization unit 172 detects $R(I(x,y))$ corresponding to the index value $I(x,y)$ from the representative value table $R(n)$, and then outputs $R(I(x,y))$ as a pixel value $P'(x,y)$ of a reconstructed image, as in the following Formula (8).

$$P'(x,y)=R(I(x,y)) \quad (8)$$

The inverse quantization unit 172 outputs the pixel value P'(x,y) of the reconstructed image. (Please confirm)

As described above, the image processing apparatus 100 generates the quantization table and the representative value table as pre-processing, and thus the quantization unit 171 and the inverse quantization unit 172 merely transform input data according to their table. Thus, the quantization unit 171 can perform the quantization process at a high speed. Further, the inverse quantization unit 172 can perform the inverse quantization process at a high speed.

[Flow of Quantization Table Setting Process]

Next, an example of the flow of a process executed by each device described above will be described. First, an example of the flow of a quantization table setting process executed by the image processing apparatus 100 will be described with reference to the flowchart of FIG. 6. Here, the quantization table represents the quantization table and the representative value table.

When the quantization table setting process starts, in step S101, the histogram generating unit 101 generates a histogram of an image having a bit depth of N bits. In step S102, the non-zero class detecting unit 102 obtains the effective pixel number Ne in which the appearance frequency is not zero in the histogram generated in step S101. Further, the non-zero class detecting unit 102 obtains each effective pixel value $m_i$.

In step S103, the effective pixel number allocation calculating unit 103 calculates an effective pixel number (equal allocation number) s which is equally allocated to each class using the effective pixel number Ne obtained in step S102. In step S104, the allocation residual calculating unit 104 calculates an allocation residual Nh using the effective pixel number Ne obtained in step S102 and the equal allocation number s calculated in step S103.

In step S105, the quantization table generating unit 105 sets a quantization table $T(m_i)$ using the effective pixel value $m_i$ obtained in step S102, the equal allocation number s calculated in step S103, and the allocation residual Nh calculated in step S104. In step S106, the representative value table generating unit 106 sets a representative value table R(n) using the effective pixel value $m_i$ obtained in step S102, the equal allocation number s calculated in step S103, and the allocation residual Nh calculated in step S104.

In step S107, the quantization table storage unit 107 stores the quantization table $T(m_i)$ set in step S105. In step S108, the representative value table storage unit 108 stores the representative value table R(n) set in step S106.

When the process of step S108 ends, the representative value table storage unit 108 ends the quantization table setting process.

[Flow of Quantization Table Setting Process]

Next, an example of the flow of a quantization table setting process executed in step S105 of FIG. 6 will be described with reference to the flowchart of FIG. 7.

When the quantization table setting process starts, in step S121, the control unit 131 of the quantization table generating unit 105 determines whether or not an identification number i of an effective pixel of a processing target is smaller than Nh×(s+1). In other words, allocation of an effective pixel value is performed in order starting from a class having a low number, but the control unit 131 determines whether or not the allocation has reached Nh-th allocation from allocation to a class having a low number.

When it is determined that an identification number i of an effective pixel of a processing target is smaller than Nh×(s+1), that is, when it is determined that a class to which an effective pixel value is to be allocated has not reached an Nh-th class from a class having a low number, the control unit 131 causes the process to proceed to step S122.

In step S122, the first index value deciding unit 132 decides a class to which an effective pixel is to be allocated by a method of allocating effective pixels to each class by (s+1). In other words, the first index value deciding unit 132 decides an effective pixel value $m_i$ to allocate on a class of a processing target using the above-described Formula (3). When the process of step S122 ends, the first index value deciding unit 132 causes the process to proceed to step S124.

Further, when it is determined in step S121 that an identification number i of an effective pixel of a processing target is equal to or greater than Nh×(s+1), that is, when it is determined in step S121 that a class to which an effective pixel value is to be allocated has reached an Nh-th class from a class having a low number, the control unit 131 causes the process to proceed to step S123.

In step S123, the second index value deciding unit 133 decides a class to which an effective pixel is to be allocated by a method of allocating effective pixels to each class by s. In other words, the first index value deciding unit 132 decides an effective pixel value $m_i$ to allocate on a class of a processing target using the above-described Formula (4). When the process of step S123 ends, the second index value deciding unit 133 causes the process to proceed to step S124.

In step S124, the control unit 131 determines whether or not all of effective pixel values in the histogram have been processed. When an unprocessed effective pixel is present, the control unit 131 causes the process to return to step S121, and then the processes of step S121 and subsequent steps are repeated. Further, when it is determined in step S124 that all of effective pixel values in the histogram have been processed, the control unit 131 causes the process to proceed to step S125.

In step S125, the table generating unit 134 tabulates a correspondence relation between each effective pixel value and a class. When the process of step S125 ends, the table generating unit 134 ends the quantization table setting process, and then the process returns to FIG. 6.

[Flow of Quantization Process]

Figure 8:
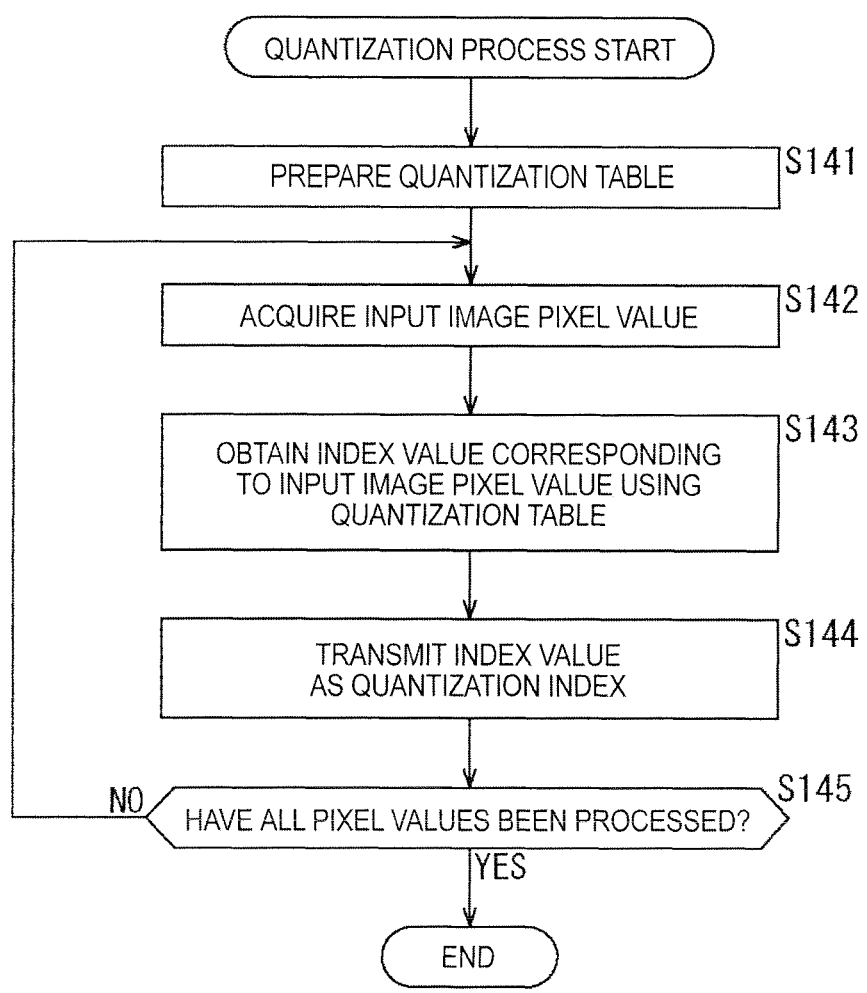
FIG. 8 is a flowchart describing an example of the flow of a quantization process.

Next, an example of the flow of a quantization process executed by the quantization unit 171 (FIG. 5) will be described with reference to the flowchart of FIG. 8.

When the quantization process starts, in step S141, the quantization unit 171 reads a quantization table corresponding to an input image from the quantization table storage unit 107 and prepares the quantization table. In step S142, the quantization unit 171 acquires an input image pixel value.

In step S143, the quantization unit 171 obtains an index value corresponding to the input image pixel value using the quantization table. In step S144, the quantization unit 171 transmits the index value obtained in step S143 to an inverse quantization side as a quantization index.

In step S145, the quantization unit 171 determines whether or not all pixel values in the input image have been processed. When it is determined that an unprocessed pixel value is presented, the quantization unit 171 causes the process to return to step S142, and then the processes of step S142 and subsequent steps are repeated.

When it is determined in step S145 that all pixel values in the input image have been processed, the quantization unit 171 ends the quantization process.

[Flow of Inverse Quantization Process]

Figure 9:
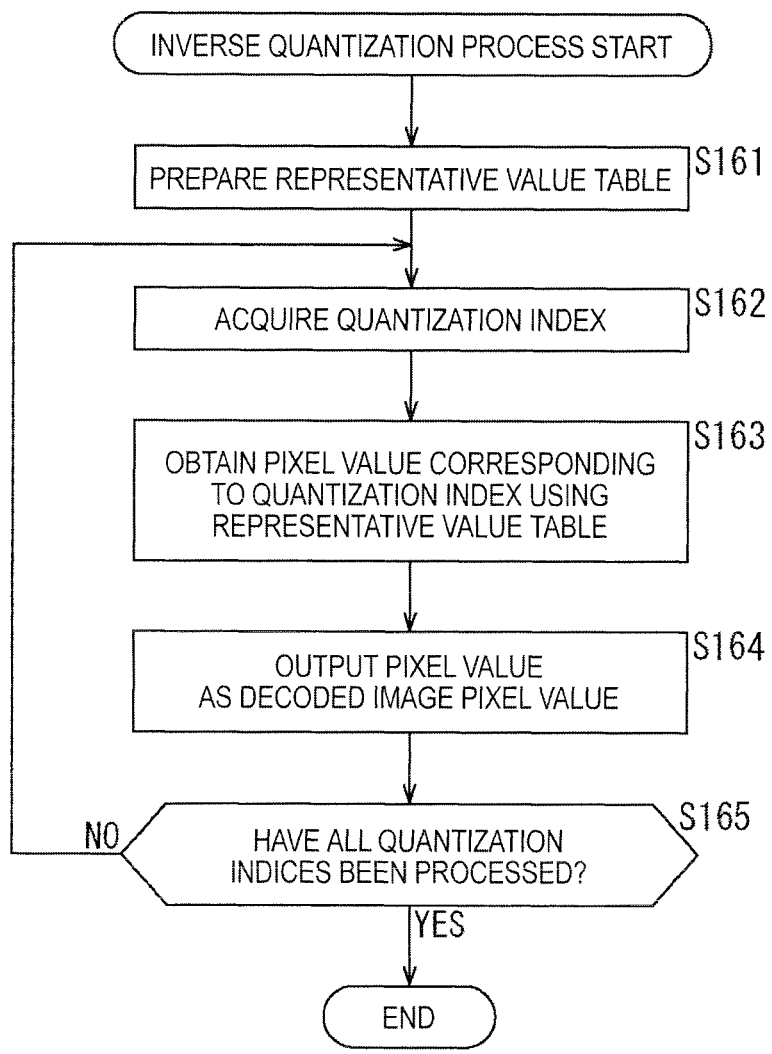
FIG. 9 is a flowchart describing an example of the flow of an inverse quantization process.

Next, an example of the flow of an inverse quantization process executed by the inverse quantization unit 172 (FIG. 5) will be described with reference to the flowchart of FIG. 9.

When the inverse quantization process starts, in step S161, the inverse quantization unit 172 reads a representative value table corresponding to an input image from the representative value table storage unit 108, and prepares the representative value table. In step S162, the inverse quantization unit 172 acquires a quantization index.

In step S163, the inverse quantization unit 172 obtains a pixel value corresponding to the quantization index using the representative value table. In step S164, the inverse quantization unit 172 outputs the pixel value obtained in step S163 as a decoded image pixel value.

In step S165, the inverse quantization unit 172 determines whether or not all quantization indices have been processed. When it is determined that an unprocessed quantization index is presented, the inverse quantization unit 172 causes the process to return to step S162, and then the processes of step S162 and subsequent steps are repeated.

Further, when it is determined in step S165 that all quantization indices have been processed, the inverse quantization unit 172 ends the inverse quantization process.

By performing each process as described above, the image processing apparatus 100 can achieve both a reduction in quantization error and an increase in quantization/inverse quantization process speed.

[Example Evaluation Results]

Figure 17:
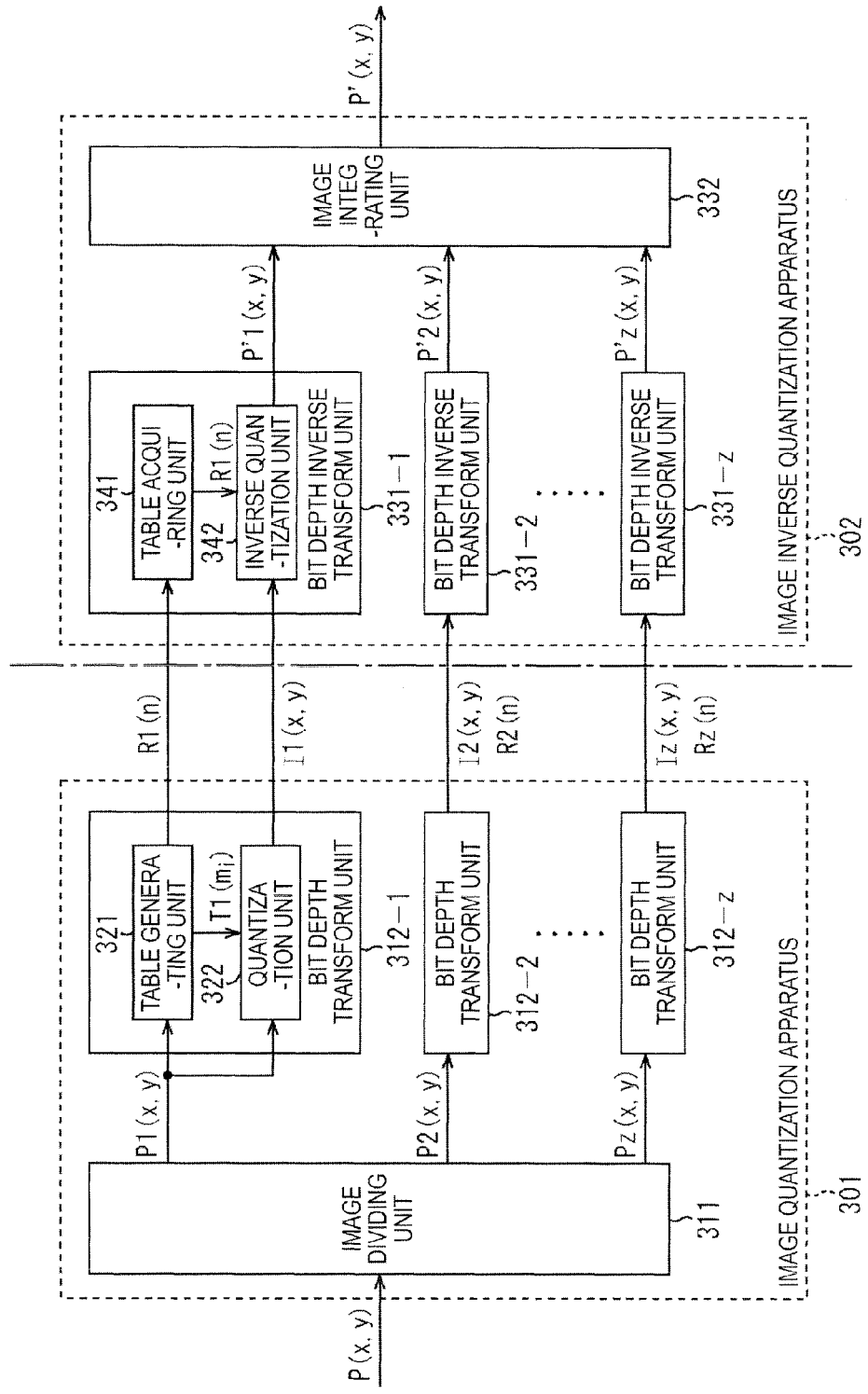
FIG. 17 is a block diagram illustrating another example configuration of a system that performs quantization and inverse quantization.

Next, example results of evaluating the quantization process and the inverse quantization process described above will be described. A medical image of 12-bit depth illustrated in FIG. 17 is used as a processing target of quantization/inverse quantization. The resolution is 512 pixels in a horizontal direction and 512 pixels in a vertical direction.

A value (a peak signal-to-noise ratio (PSNR)) obtained by comparing an image obtained by quantizing an original image (N=12 bits) into L bits and then inversely quantizing the quantized image into N bits with the original image is used as an evaluation value. As the PSNR increases, deterioration is kept small. Further, four cases in which L is 8 to 11 are evaluated.

FIG. 11 is a view illustrating a comparison of evaluation results of three quantization/inverse quantization methods, that is, the Lloyd-Max quantization technique, the linear quantization technique of the related art in which a least significant bit is rounded down, and the "present technique" described above.

Figure 10:
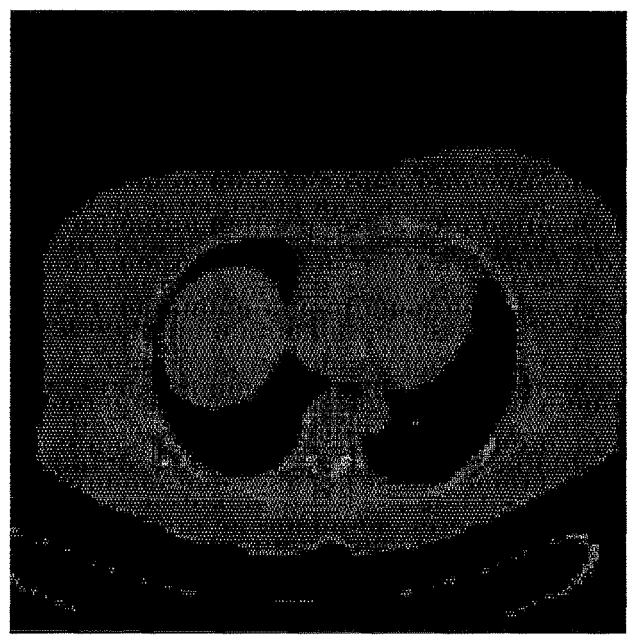
FIG. 10 is a diagram illustrating an example of a medical image of 12-bit depth.

As a result of measuring a histogram of an image illustrated in FIG. 10, the number Ne of pixels whose appearance frequency was not zero is 1,835. Since $2^{11}$=2,048 and $2^{10}$=1, 024, when L is 11 bits, reversible quantization and inverse quantization could be performed on this image. Thus, as illustrated in the table of FIG. 11, in the case of the present technique or the Lloyd-Max quantization technique, when L is 11, the PSNR becomes infinite ($\infty$). In other words, the two techniques have much higher PSNRs than the linear quantization technique of the related art. Even when quantization is performed at L of 10 bits or less, the same tendency is shown.

Further, as illustrated in the table of FIG. 11, when quantization is performed at any bit number, the present technique can obtain substantially the same PSNR (a difference of about 0.1 dB) as the Lloyd-Max quantization technique.

In the table illustrated in FIG. 12, a processing time of the quantization process of the present technique is compared to that in the Lloyd-Max quantization technique. In case of the present technique, a processing time for generating the quantization table and the representative value table is also included in the processing time.

The present technique involves mapping transform to a class of M bits of an effective pixel and thus does not require the iterative process which is necessary in the Lloyd-Max quantization technique. Thus, as illustrated in the table of FIG. 12, the present technique can perform the quantization process at a higher speed (in a shorter time) than the Lloyd-Max quantization technique.

As described above, using the present technique, quantization error caused by quantization/inverse quantization can be further reduced, quantization/inverse quantization (bit transform) can be performed so that a high-quality image can be obtained, and quantization/inverse quantization can be performed at a high speed.

2. Second Embodiment

Quantization Table Generating Unit

The first embodiment has been described in connection with the example in which effective pixels are allocated to each of Nh classes by the allocation residual Nh starting from a class having a low identification number. However, it is optional which of $2^M$ classes is used as Nh classes to which (s+1) effective pixels are allocated. For example, (s+1) effective pixels may be allocated to Nh classes in order of ascending appearance frequency of the allocated effective pixel.

Figure 13:
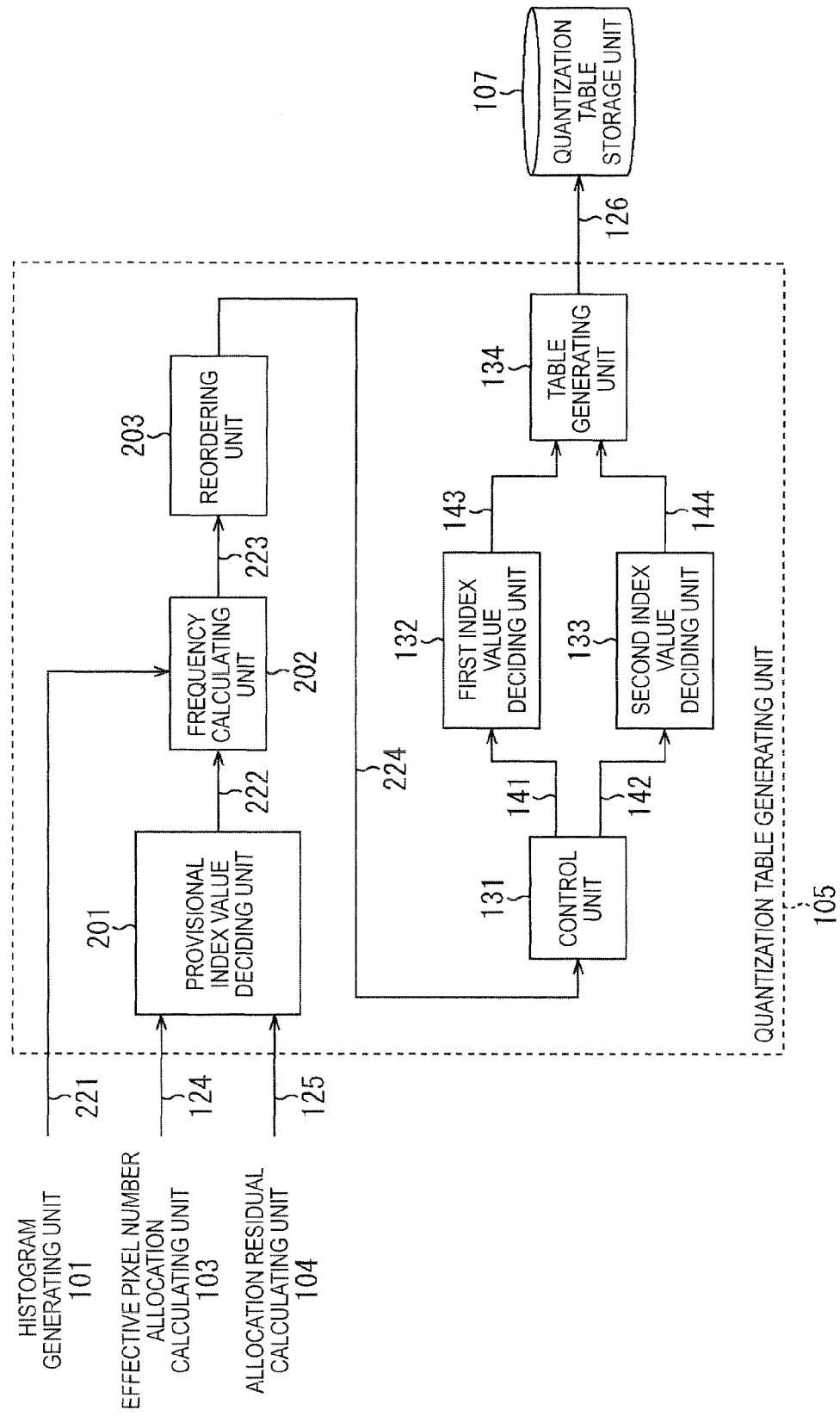
FIG. 13 is a block diagram illustrating an example of a main configuration of a quantization table generating unit.

FIG. 13 is a block diagram illustrating an example of a main configuration of a quantization table generating unit 105 in this case. As illustrated in FIG. 13, the quantization table generating unit 105 in this case includes a provisional index value deciding unit 201, a frequency calculating unit 202, and a reordering unit 203, in addition to the configuration of the quantization table generating unit 105 (FIG. 3) of the first embodiment.

The provisional index value deciding unit 201 allocates the effective pixel value $m_i$ to each class by s in the order of ascending effective pixel value using the effective pixel number Ne, the equal allocation number s, and the allocation residual Nh, and Formula (4), similarly to the second index value deciding unit 133. In other words, the provisional index value deciding unit 201 allocates ($2^M \times s$) effective pixel values $m_i$. Thus, at this point in time, Nh effective pixel values $m_i$ have not been allocated yet. The provisional index value deciding unit 201 supplies the allocation results (a correspondence relation between each class and the effective pixel value $m_i$) and various parameters such as the effective pixel number Ne, the equal allocation number s, and the allocation residual Nh to the frequency calculating unit 202 (arrow 222).

The frequency calculating unit 202 acquires a histogram from the histogram generating unit 101 (arrow 221). The frequency calculating unit 202 obtains an appearance frequency of each effective pixel allocated to each class with reference to the histogram acquired from the histogram generating unit 101 according to the allocation results acquired from the provisional index value deciding unit 201, and calculates the sum of the appearance frequencies of each class.

The frequency calculating unit 202 supplies the calculated appearance frequency of the effective pixel of each class to the reordering unit 203 together with information supplied from the provisional index value deciding unit 201 and the histogram generating unit 101 (arrow 223).

The reordering unit 203 reorders each class in the order of ascending appearance frequency of the effective pixel allocated to each class. The reordering unit 203 supplies the reordering result (information representing a reordered order of a class after transform) to the control unit 131 together with a variety of information supplied from the frequency calculating unit 202 (arrow 224).

The configuration from the control unit 131 to the table generating unit 134 performs allocation of an effective pixel to a class whose order is reordered, similarly to the first embodiment. Here, allocation of effective pixels corresponding to the allocation residual Nh (that is, all effective pixels) is performed. In other words, the control unit 131 to the table generating unit 134 allocate effective pixels to each of first to Nh-th classes in the updated order by (s+1), and allocate one effective pixel to each of (Nh+1)-th and subsequent classes.

Through this operation, the quantization table generating unit 105 can allocate many (s+1) effective pixels to each of Nh classes which have low appearance frequencies.

[Flow of Quantization Table Setting Process]

Next, an example of the flow of a quantization table setting process in this case will be described with reference to the flowchart of FIG. 14.

When the quantization table setting process starts, in step S201, the provisional index value deciding unit 201 decides a class to which (2×s) effective pixels are to be allocated by a method of allocating effective pixels by s.

In step S202, the frequency calculating unit 202 calculates the sum of appearance frequencies of the respective effective pixels for each class based on the allocation results in step S201.

In step S203, the reordering unit 203 reorders each class in the order of ascending frequency value of effective pixels of each class calculated in step S202.

Figure 7:
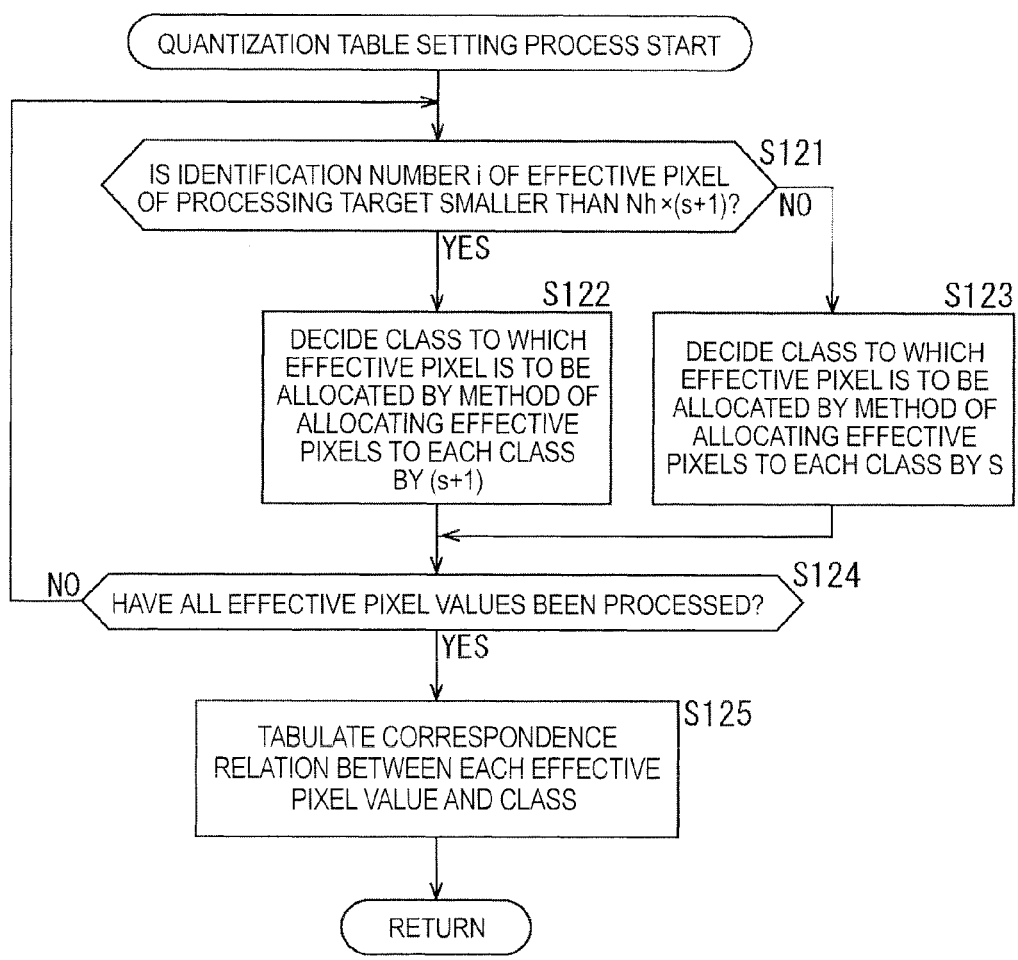
FIG. 7 is a flowchart describing an example of the flow of a quantization table setting process.

The processes of steps S204 to S208 are performed on a class reordered in step S203 in the same way as the processes of steps S121 to S125 of FIG. 7.

Figure 6:
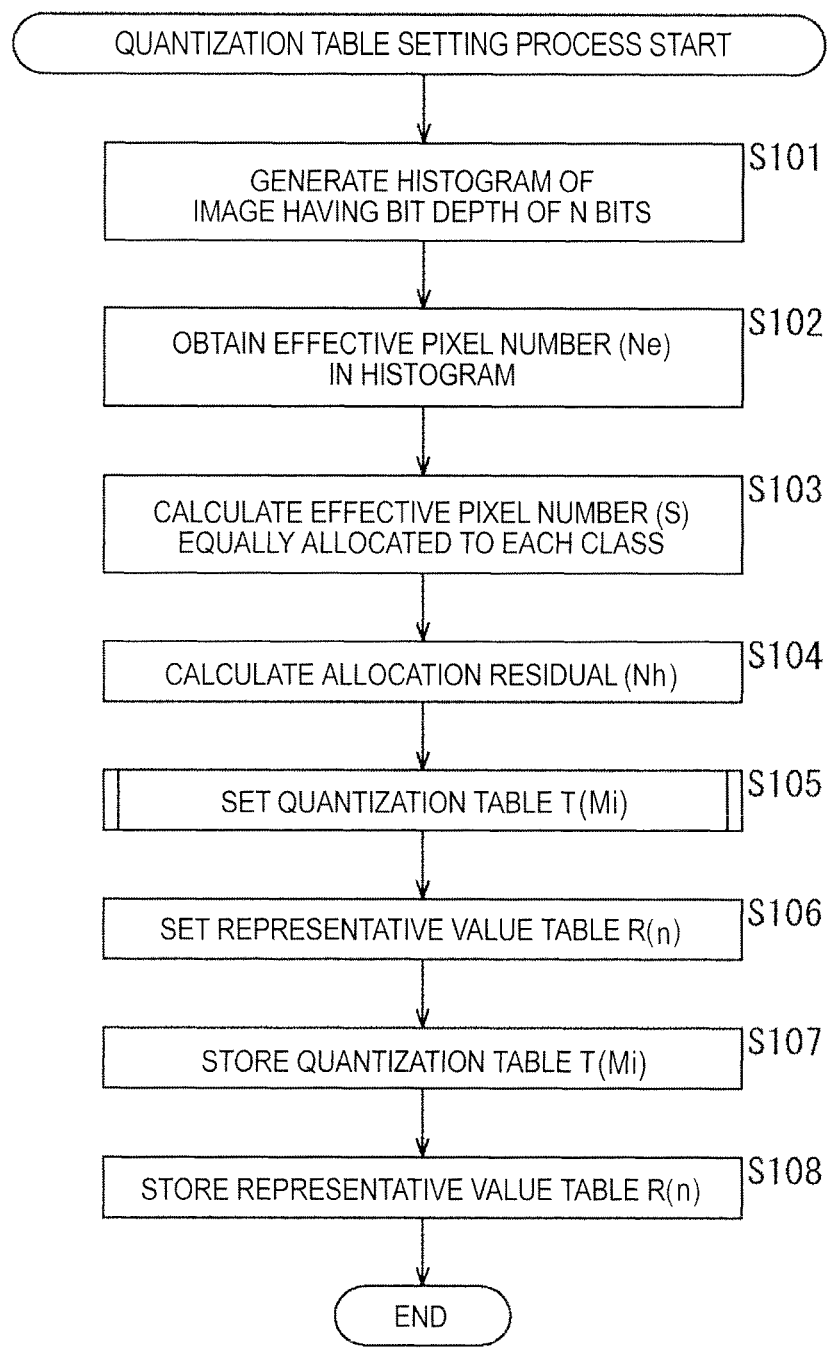
FIG. 6 is a flowchart describing an example of the flow of a quantization table setting process.

When the process of step S208 ends, the table generating unit 134 ends the quantization table setting process, and then the process returns to FIG. 6.

As described above, by performing the quantization table setting process, the quantization table generating unit 105 can allocate an effective pixel to each class and set the quantization table similarly to the first embodiment. However, in this case, the quantization table generating unit 105 can allocate many (s+1) effective pixels to each of Nh classes which have low appearance frequencies.

Since many (s+1) effective pixels can be allocated to each of Nh classes which have low appearance frequencies, deviation of the appearance frequency between classes can be reduced. Accordingly, deviation of the accuracy of the representative value of each class can be reduced (increased uniformity).

3. Third Embodiment

Quantization Table Generating Unit

In the method described in the second embodiment, a change in the appearance frequency by addition of allocation of effective pixels corresponding to the allocation residual Nh is not reflected. In other words, at a point in time in which s effective pixels are allocated, an effective pixel having a high appearance frequency among remaining effective pixels is not necessarily additionally allocated to a class having a low appearance frequency.

In this regard, by repeatedly processing allocation of an effective pixel, at a point in time in which s effective pixels are allocated, an effective pixel having a high appearance frequency among remaining effective pixels may be additionally allocated to a class having a low appearance frequency.

Figure 15:
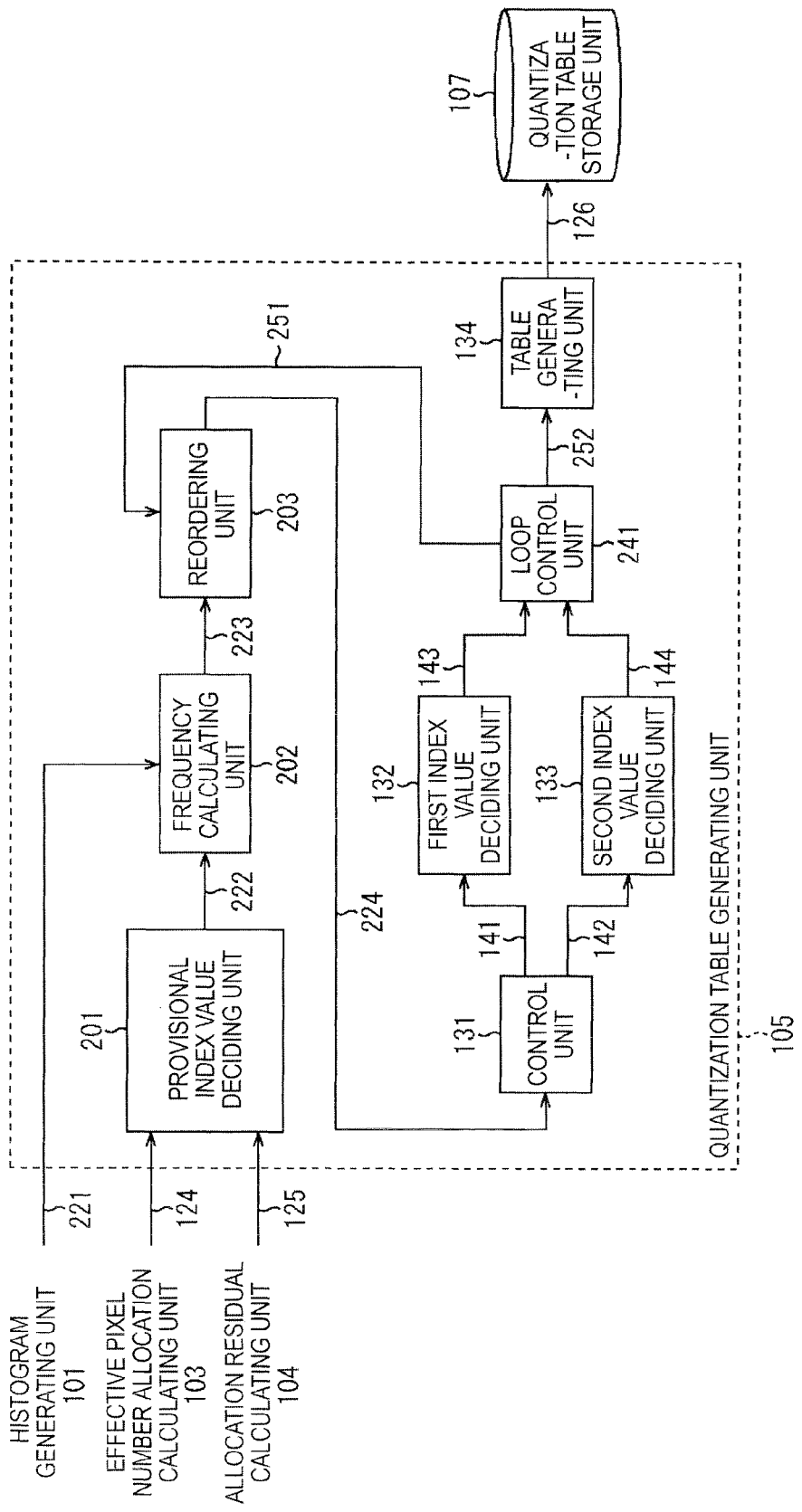
FIG. 15 is a block diagram illustrating an example of a main configuration of a quantization table generating unit.

FIG. 15 is a block diagram illustrating an example of a main configuration of a quantization table generating unit 105 in this case. As illustrated in FIG. 15, the quantization table generating unit 105 in this case includes a loop control unit 241 in addition to the configuration of the quantization table generating unit 105 (FIG. 13) of the second embodiment.

The loop control unit 241 checks the frequency value of each class after all effective pixels are allocated, and then determines whether or not each class is arranged in the order of ascending frequency value. When each class is not arranged in the order of ascending frequency value of the effective pixel by allocating all effective pixels including a non-allocated effective pixels in the provisional index value deciding unit 201, the loop control unit 241 causes the process to return to the reordering unit 203, and thus each class is reordered in the order of ascending frequency value again, and allocation of an effective pixel restarts. The loop control unit 241 repeatedly executes this process until an arrangement of each class is not updated.

[Flow of Quantization Table Setting Process]

Figure 16:
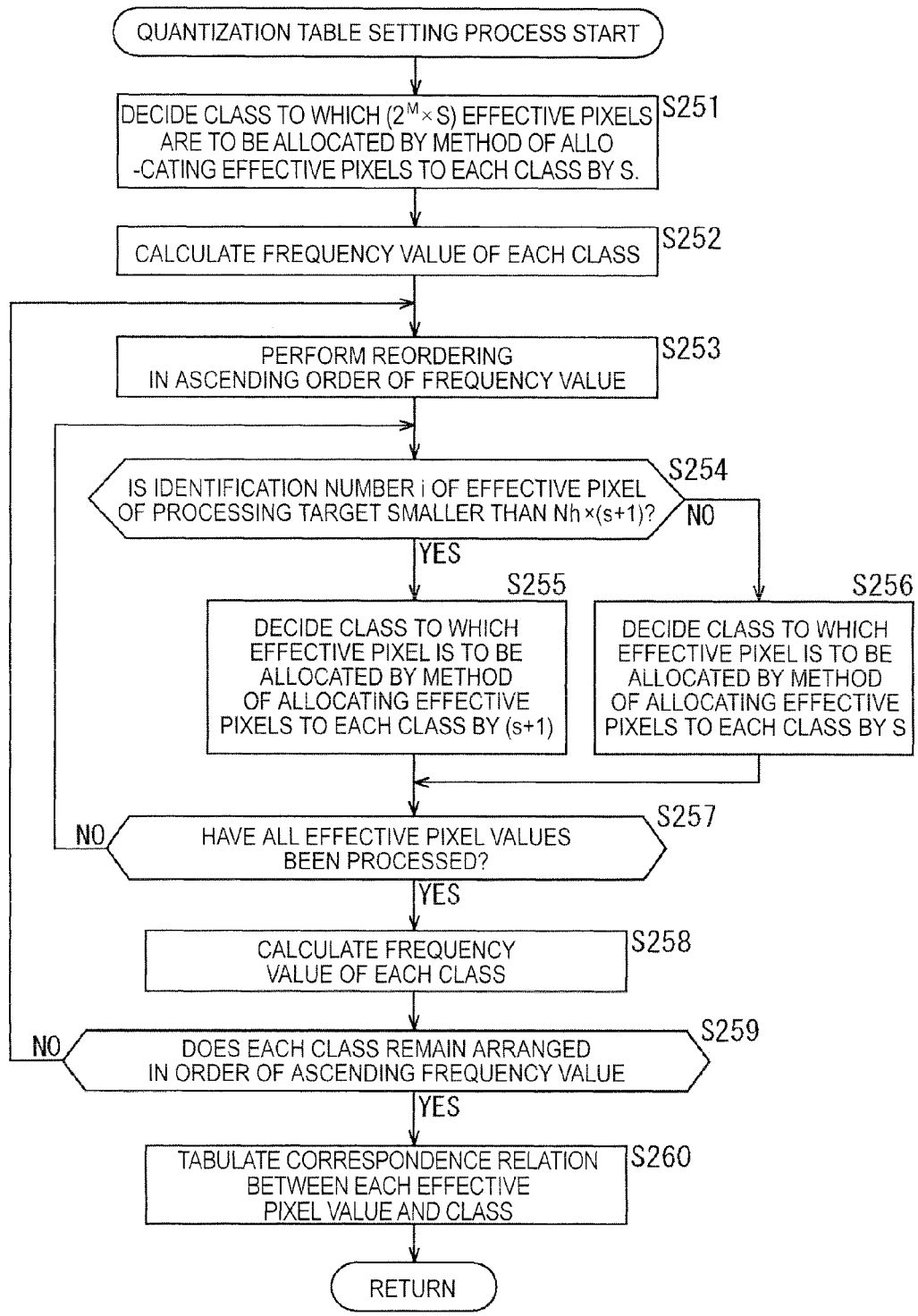
FIG. 16 is a flowchart describing another example of the flow of a quantization table setting process

Next, an example of the flow of a quantization table setting process in this case will be described with reference to the flowchart of FIG. 16.

Figure 14:
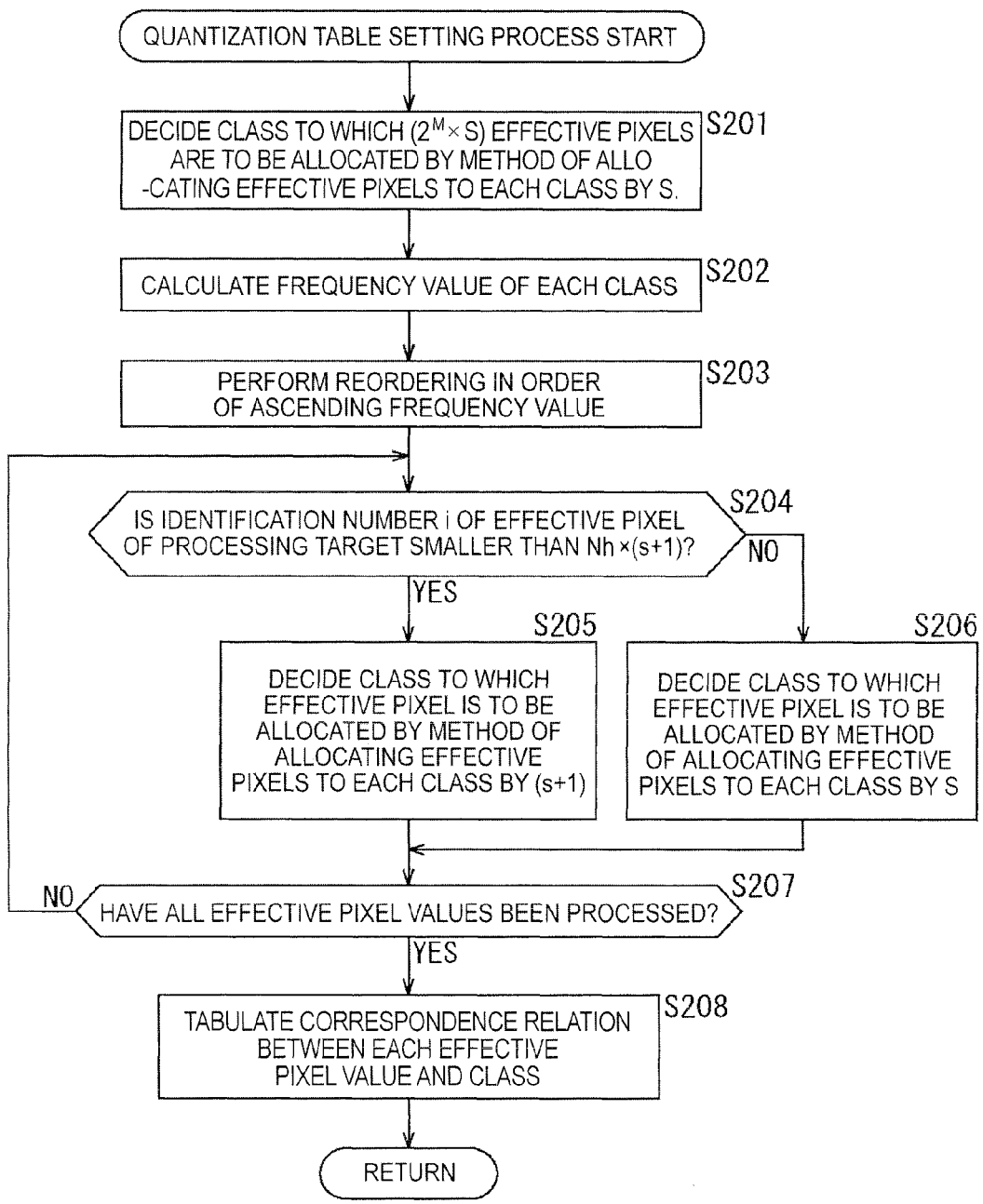
FIG. 14 is a flowchart describing another example of the flow of a quantization table setting process.

Processes of steps S251 to S257 are executed in the same way as in the second embodiment (the processes of steps S201 to S207 in FIG. 14).

In step S258, the loop control unit 241 calculates a frequency value (the sum of each class of frequency values of effective pixels allocated to each class) of an effective pixel of each class in a state in which all effective pixels are allocated in step S255 or step S256.

In step S259, the loop control unit 241 determines whether or not each class remains arranged in the order of ascending frequency value. When it is determined that an arrangement order of each class is not the order of ascending frequency value, the loop control unit 241 causes the process to return to step S253, and control is performed such that the process of step S253 and subsequent steps are repeated.

Further, when it is determined in step S259 that an arrangement order of each class is the order of ascending frequency value, the loop control unit 241 causes the process to proceed to step S260. A process of step S260 is executed in the same way as in the second embodiment (step S208 of FIG. 14).

As described, by executing the quantization table setting process, the quantization table generating unit 105 can further reduce deviation of the appearance frequency between classes compared to the second embodiment. Accordingly, deviation of the accuracy of the representative value of each class can be further reduced (greater uniformity).

4. Fourth Embodiment

Quantization/Inverse Quantization System

Further, an input image may be divided into a plurality of areas, a quantization table and a representative value table may be generated for each area, and then a quantization process and an inverse quantization process may be performed.

FIG. 17 is a block diagram illustrating an example of a main configuration of an image processing system in this case.

An image processing system illustrated in FIG. 17 divides an input image into a plurality of areas, generates a quantization table and a representative value table for each area, and then performs a quantization process and an inverse quantization process. As illustrated in FIG. 17, the image processing system includes an image quantization apparatus 301 and an image inverse quantization apparatus 302.

The image quantization apparatus 301 includes an image dividing unit 311, and bit depth transform units 312-1 to 312-Z. The image dividing unit 311 divides an input image P(x,y) into Z areas, and then supplies images of the respective areas to the bit depth transform units 312-1 to 312-Z, respectively.

The bit depth transform unit 312-1 transforms a bit depth of a pixel value of an image $P1(x,y)$ of a first area from N bits to M bits (N>M). In other words, the bit depth transform unit 312-1 performs quantization of the pixel value of the image $P1(x,y)$ of the first area.

The bit depth transform unit 312-1 includes a table generating unit 321 and a quantization unit 322. The table generating unit 321 has the same configuration as the image processing apparatus 100 of FIG. 2, and performs the same process as the image processing apparatus 100 of FIG. 2. In other words, the table generating unit 321 generates a quantization table $T1(m_i)$ and a representative value table $R1(n)$ on the image $P1(x,y)$ of the first area. The table generating unit 321 supplies the generated quantization table $T1(m_i)$ to the quantization unit 322. Further, the table generating unit 321 supplies the generated representative value table $R1(n)$ to the image inverse quantization apparatus 302.

The quantization unit 322 has the same configuration as the quantization unit 171 of FIG. 5, and performs the same process as the quantization unit 171 of FIG. 5. In other words, the quantization unit 322 performs quantization of each pixel value of the image $P1(x,y)$ of the first area using the quantization table $T1(m_i)$ supplied from the table generating unit 321. The quantization unit 322 supplies the quantization index $I1(x,y)$ generated by the quantization to the image inverse quantization apparatus 302.

Each of the bit depth transform units 312-2 to 312-Z has the same configuration as the bit depth transform unit 312-1, and performs the same process as the bit depth transform unit 312-1 on an image of an area corresponding to itself.

For example, the bit depth transform unit 312-2 quantizes a pixel value of an image $P2(x,y)$ of a second area, and supplies a representative value table $R2(n)$ and a quantization index $I2(x,y)$ corresponding to the image $P2(x,y)$ of the second area to the image inverse quantization apparatus 302.

Further, for example, the bit depth transform unit 312-Z quantizes a pixel value of an image Pz(x,y) of a Z-th area, and supplies a representative value table Rz(n) and a quantization index Iz(x,y) corresponding to the image Pz(x,y) of the Z-th area to the image inverse quantization apparatus 302.

When the bit depth transform units 312-1 to 312-Z need not be separately described, the bit depth transform units 312-1 to 312-Z are referred to as a bit depth transform unit 312.

The image inverse quantization apparatus 302 includes bit depth inverse transform unit 331-1 to 331-Z, and an image integrating unit 332.

The bit depth inverse transform unit 331-1 acquires the representative value table $R1(n)$ and the quantization index $I1(x,y)$ supplied from the image quantization apparatus 301, and inversely transforms the bit depth of the quantization index $I1(x,y)$ from M bits to N bits. In other words, the bit depth inverse transform unit 331-1 performs inverse quantization of the quantization index $I1(x,y)$ of the first area, and generates a decoded image $P'1(x,y)$ of a first area. The bit depth inverse transform unit 331-1 supplies the generated decoded image $P'1(x,y)$ of the first area to the image integrating unit 332.

The bit depth inverse transform unit 331-1 includes a table acquiring unit 341 and an inverse quantization unit 342. The table acquiring unit 341 acquires the representative value table $R1(n)$ supplied from the image quantization apparatus 301, and appropriately supplies the acquired representative value table $R1(n)$ to the inverse quantization unit 342. The inverse quantization unit 342 has the same configuration as the inverse quantization unit 172 of FIG. 5, and performs the same process as the inverse quantization unit 172 of FIG. 5. In other words, the inverse quantization unit 342 performs inverse quantization of the quantization index $I1(x,y)$ of the first area using the representative value table $R1(n)$ supplied from the table acquiring unit 341. The inverse quantization unit 342 supplies the decoded image $P'1(x,y)$ of the first area generated by the inverse quantization to the image integrating unit 332.

Each of the bit depth inverse transform units 331-2 to 331-Z has the same configuration as the bit depth inverse transform unit 331-1, and performs the same process as the bit depth inverse transform unit 331-1 on a quantization index of an area corresponding to itself.

For example, the bit depth inverse transform unit 331-2 inversely quantizes a quantization index $I2(x,y)$ of a second area using a representative value table $R2(n)$ of the second area, and supplies a decoded image $P'2(x,y)$ of the second area to the image integrating unit 332.

Further, for example, the bit depth inverse transform unit 331-Z inversely quantizes a quantization index Iz(x,y) of a second area using a representative value table Rz(n) of the second area, and supplies a decoded image P'z(x,y) of the second area to the image integrating unit 332.

When the bit depth inverse transform units 331-1 to 331-Z need not be separately described, the bit depth inverse transform units 331-1 to 331-Z are referred to as a bit depth inverse transform unit 331.

The image integrating unit 332 integrates the decoded images $P'1(x,y)$ to P'z(x,y) supplied from the respective bit depth inverse transform units 331, generates a decoded image P'(x,y) corresponding to the input image P(x,y), and outputs the generated decoded image P'(x,y).

The respective bit depth transform units 312 can perform processing independently of one another. In other words, some or all of the bit depth transform units 312 may perform processing in parallel with one another (may execute processing on a plurality of blocks at a certain time) or may perform processing at different timings.

Similarly, the respective bit depth inverse transform units 331 can perform processing independently of one another. In other words, some or all of the bit depth inverse transform units 331 may perform processing in parallel with one another (may execute processing on a plurality of blocks at a certain time) or may perform processing at different timings.

An image of each block has a smaller total number of pixel values than an entire image, and so sparsity is high. Thus, a quantization error occurring when an image of each block is quantized and then inversely quantized is reduced compared to when the same processing is performed on the entire image. Further, by executing quantization on respective blocks in parallel, a processing time can be reduced.

However, when quantization and inverse quantization (bit transform) are performed on the entire image, the number of necessary tables is reduced and the amount of information can be reduced as much.

The size and shape of each block described above are arbitrary and can be set independently. Thus, the image dividing unit 311 may perform block division according to content of an image input so that sparsity can be increased.

The above description has been made in connection with the example in which an input image is configured with a single component, but the present invention is not limited to this example. For example, an input image may be configured with a plurality of components like RGB or YCrCb. In this case, it is desirable to generate a quantization table and a representative value table and performs a quantization process and an inverse quantization process, for each component, in the above-described way. Further, the processes on each component may be performed independently. Thus, the processes on each component may be performed in parallel or at different timings.

Further, the above description has been made in connection with quantization and inverse quantization of each pixel value of image data, but data of a processing target is not limited to a pixel value to the extent that data of a processing target is a set having sparsity of some data. For example, data of a processing target may be an orthogonal transform coefficient obtained by performing orthogonal transform (for example, discrete cosine transform (DCT) or wavelet transform) on image data.

Each apparatus described above may include components other than those described above. For example, each apparatus described above may be configured as equipment or a device using an image captured by an imaging element (a CMOS sensor or a CCD sensor), a compression circuit for writing an imaging element image in a memory, a digital camera, a moving picture camcorder, a medical image camera, a medical endoscope, a monitoring camera, a digital cinema shooting camera, a binocular image camera, a multi-view image camera, a memory reduction circuit of an LSI chip, an authoring tool on a personal computer (PC), a software module thereof, or the like. Further, each apparatus described above may be configured as a system including a plurality of apparatuses as well as a single apparatus.

5. Fifth Embodiment

Personal Computer

The series of processes described above can be realized by hardware or software. In such a case, a personal computer such as the one shown in FIG. 18 can be configured, for example.

In FIG. 18, a central processing unit (CPU) 401 of a personal computer 400 executes various processes according to a program stored in a read-only memory (ROM) 402 or a program loaded from a storage unit 413 to a random access memory (RAM) 403. In the RAM 403, data that is necessary for executing the various processes by the CPU 401 is appropriately stored.

The CPU 401, the ROM 402, and the RAM 403 are connected mutually by a bus 404. Also, an input/output interface 410 is connected to the bus 404.

An input unit 411 that includes a keyboard and a mouse, an output unit 412 that includes a display composed of a cathode ray tube (CRT) display, a liquid crystal display (LCD) and a speaker, a storage unit 413 that is configured using a solid state drive (SSD) such as a flash memory or a hard disk, and a communication unit 414 that is configured using a wired local area network (LAN) or wireless LAN interface and a modem are connected to the input/output interface 410. The communication unit 414 executes communication processing through a network including the Internet.

A drive 415 is connected to the input/output interface 410 as needed, a removable medium 421 such as a magnetic disk, an optical disc, a magneto optical disc, or a semiconductor memory is appropriately mounted, and a computer program that is read from the removable media 421 is installed in the storage unit 413 as needed.

When the series of processes is executed by the software, a program forming the software is installed through a network or a recording medium.

The recording medium may be configured using the removable medium 421 illustrated in FIG. 18 that is composed of a magnetic disk (including a floppy disk), an optical disc (including a compact disc read-only memory (CD-ROM) and a digital versatile disc (DVD)), a magneto optical disc (including a mini-disc (MD)), or a semiconductor memory, which has a recorded program and may be distributed to provide the program to users, unlike a device body, and may be configured using a hard disk that is included in the ROM 402 having a program recorded in advance, embedded in the device body and provided to the user, or the storage unit 413.

It should be noted that the program executed by a computer may be a program that is processed in time series according to the sequence described in this specification or a program that is processed in parallel or at necessary timing such as upon calling.

It should be also noted that, in this specification, the steps describing the program stored in the recording medium include not only a process performed in time series according to the sequence shown herein, but also a process executed in parallel or individually, not necessarily performed in time series.

Further, in this specification, "system" refers to an overall device composed of a plurality of devices.

Further, an element described as a single device (or processing unit) above may be configured as a plurality of devices (or processing units). On the other hand, elements described as a plurality of devices (or processing units) above may be configured collectively as a single device (or processing unit). Further, an element other than those described above may be added to each device (or processing unit). Furthermore, a part of an element of a given device (or processing unit) may be included in an element of another device (or another processing unit) as long as the configuration or operation of the system as a whole is substantially the same. In other words, an embodiment of the present disclosure is not limited to the embodiments described above, and various changes and modifications may be made without departing from the scope of the disclosure.

It should be understood by those skilled in the art that various modifications, combinations, sub-combinations and alterations may occur depending on design requirements and other factors insofar as they are within the scope of the appended claims or the equivalents thereof.

The present technology may also be configured as below.

(1) An image processing apparatus, comprising:
a histogram generating unit that generates a histogram representing an appearance frequency distribution of a pixel value of an input image; and
a quantization table generating unit that generates a quantization table including table information used to perform transform of a bit depth of the pixel value of the input image and table information used to allocate an effective pixel in which an appearance frequency in the histogram generated by the histogram generating unit is not zero to an index value after bit depth transform so that effective pixels are allocated to the index values as equally as possible.

(2) The image processing apparatus according to (1),
wherein the quantization table generating unit allocates the effective pixels corresponding to an equal allocation number s or (s+1), which is the maximum number of effective pixels which can be equally allocated to all index values after bit depth transform to each index value.

(3) The image processing apparatus according to (2),
wherein the quantization table generating unit comprises:
a first index value deciding unit that allocates the effective pixels to each index value by the equal allocation number (s+1);
a second index value deciding unit that allocates the effective pixels to each index value by the equal allocation number s; and
a control unit that selects one of the first index value deciding unit or the second index value deciding unit, and allocates the effective pixel using the selected index value deciding unit.

(4) The image processing apparatus according to (3),
wherein the control unit performs control such that the effective pixels are allocated in order of ascending index value, and allocation of the effective pixels is performed by the first index value deciding unit until the number of index values to which the effective pixels are allocated reaches an allocation residual Nh representing the number of remaining effective pixels when the effective pixels are allocated to each index value by the equal allocation number s, and
the control unit performs control such that allocation of the effective pixels is performed by the second index value deciding unit after the number of index values to which the effective pixels are allocated reaches the allocation residual Nh.

(5) The image processing apparatus according to (4), further comprising:
an effective pixel information generating unit that detects the effective pixel in the histogram generated by the histogram generating unit, and obtains an effective pixel number representing the number of effective pixels and an effective pixel value representing a value of the effective pixel.

(6) The image processing apparatus according to (5), further comprising:
an equal allocation number calculating unit that calculates the equal allocation number s using the effective pixel number obtained by the effective pixel information generating unit.

(7) The image processing apparatus according to (6), further comprising:
an allocation residual calculating unit that generates the allocation residual Nh using the effective pixel number obtained by the effective pixel information generating unit and the equal allocation number generated by the equal allocation number calculating unit.

(8) The image processing apparatus according to any one of (1) to (7), further comprising:
a quantization table storage unit that stores the quantization table generated by the quantization table generating unit.

(9) The image processing apparatus according to any one of (1) to (8), further comprising:
a quantization unit that performs quantization on each pixel value of the input image using the quantization table generated by the quantization table generating unit.

(10) The image processing apparatus according to any one of (1) to (9), further comprising:
a representative value table generating unit that generates a representative value table including table information used to perform inverse transform of the bit depth of the pixel value of the input image and table information used to allocate a predetermined representative value set to each index to the index value.

(11) The image processing apparatus according to (10),
wherein the representative value table generating unit uses a center of gravity of the effective pixel values allocated to each index value as a representative value corresponding to the index value.

(12) The image processing apparatus according to (10) or (11), further comprising:
a representative value table storage unit that stores the representative value table generated by the representative value table generating unit.

(13) The image processing apparatus according to any one of (10) to (12), further comprising:
an inverse quantization unit that performs inverse quantization of the index value using the representative value table generated by the representative value table generating unit.

(14) An image processing method for an image processing apparatus, comprising:
generating, with a histogram generating unit, a histogram representing an appearance frequency distribution of a pixel value of an input image; and
generating, with a quantization table generating unit, a quantization table including table information used to perform transform of a bit depth of the pixel value of the input image and table information used to allocate an effective pixel in which an appearance frequency in the histogram generated by the histogram generating unit is not zero to an index value after bit depth transform so that effective pixels are allocated to index values as equally as possible.

The present disclosure contains subject matter related to that disclosed in Japanese Priority Patent Application JP 2011-165037 filed in the Japan Patent Office on Jul. 28, 2011, the entire content of which is hereby incorporated by reference.

What is claimed is:

1. An image processing apparatus, comprising:
a histogram generating unit that generates a histogram representing an appearance frequency distribution of a pixel value of an input image; and
a quantization table generating unit that generates a quantization table including table information used to perform transform of a bit depth of the pixel value of the input image and table information used to allocate an effective pixel in which an appearance frequency in the histogram generated by the histogram generating unit is not zero to an index value after bit depth transform so that effective pixels are allocated to the index values as equally as possible.

2. The image processing apparatus according to claim 1,
wherein the quantization table generating unit allocates the effective pixels corresponding to an equal allocation number s or (s+1), which is the maximum number of effective pixels which can be equally allocated to all index values after bit depth transform to each index value.

3. The image processing apparatus according to claim 2,
wherein the quantization table generating unit comprises:
a first index value deciding unit that allocates the effective pixels to each index value by the equal allocation number (s+1);
a second index value deciding unit that allocates the effective pixels to each index value by the equal allocation number s; and
a control unit that selects one of the first index value deciding unit or the second index value deciding unit, and allocates the effective pixel using the selected index value deciding unit.

4. The image processing apparatus according to claim 3,
wherein the control unit performs control such that the effective pixels are allocated in order of ascending index value, and allocation of the effective pixels is performed by the first index value deciding unit until the number of index values to which the effective pixels are allocated reaches an allocation residual Nh representing the number of remaining effective pixels when the effective pixels are allocated to each index value by the equal allocation number s, and the control unit performs control such that allocation of the effective pixels is performed by the second index value deciding unit after the number of index values to which the effective pixels are allocated reaches the allocation residual Nh.

5. The image processing apparatus according to claim 4, further comprising:

an effective pixel information generating unit that detects the effective pixel in the histogram generated by the histogram generating unit, and obtains an effective pixel number representing the number of effective pixels and an effective pixel value representing a value of the effective pixel.

6. The image processing apparatus according to claim 5, further comprising:

an equal allocation number calculating unit that calculates the equal allocation number s using the effective pixel number obtained by the effective pixel information generating unit.

7. The image processing apparatus according to claim 6, further comprising:

an allocation residual calculating unit that generates the allocation residual Nh using the effective pixel number obtained by the effective pixel information generating unit and the equal allocation number generated by the equal allocation number calculating unit.

8. The image processing apparatus according to claim 1, further comprising:

a quantization table storage unit that stores the quantization table generated by the quantization table generating unit.

9. The image processing apparatus according to claim 1, further comprising:

a quantization unit that performs quantization on each pixel value of the input image using the quantization table generated by the quantization table generating unit.

10. The image processing apparatus according to claim 1, further comprising:

a representative value table generating unit that generates a representative value table including table information used to perform inverse transform of the bit depth of the pixel value of the input image and table information used to allocate a predetermined representative value set to each index to the index value.

11. The image processing apparatus according to claim 10, wherein the representative value table generating unit uses a center of gravity of the effective pixel values allocated to each index value as a representative value corresponding to the index value.

12. The image processing apparatus according to claim 10, further comprising:

a representative value table storage unit that stores the representative value table generated by the representative value table generating unit.

13. The image processing apparatus according to claim 10, further comprising:

an inverse quantization unit that performs inverse quantization of the index value using the representative value table generated by the representative value table generating unit.

14. An image processing method for an image processing apparatus, comprising:

generating, with a histogram generating unit, a histogram representing an appearance frequency distribution of a pixel value of an input image; and generating, with a quantization table generating unit, a quantization table including table information used to perform transform of a bit depth of the pixel value of the input image and table information used to allocate an effective pixel in which an appearance frequency in the histogram generated by the histogram generating unit is not zero to an index value after bit depth transform so that effective pixels are allocated to index values as equally as possible.

* * * * *